United States Patent
Lim

(10) Patent No.: US 12,407,841 B2
(45) Date of Patent: Sep. 2, 2025

(54) METHOD AND DEVICE FOR ADAPTIVE SELECTION OF RICE PARAMETER FOR BINARIZING RESIDUAL COEFFICIENT IN VIDEO SIGNAL ENCODING/DECODING

(71) Applicant: KT CORPORATION, Gyeonggi-do (KR)

(72) Inventor: Sung Won Lim, Gyeonggi-do (KR)

(73) Assignee: KT CORPORATION, Gyeonggi-do (KR)

( * ) Notice: Subject to any disclaimer, the term of this patent is extended or adjusted under 35 U.S.C. 154(b) by 5 days.

(21) Appl. No.: 18/278,717

(22) PCT Filed: Feb. 25, 2022

(86) PCT No.: PCT/KR2022/002810
§ 371 (c)(1),
(2) Date: Aug. 24, 2023

(87) PCT Pub. No.: WO2022/182208
PCT Pub. Date: Sep. 1, 2022

(65) Prior Publication Data
US 2024/0137535 A1 Apr. 25, 2024
US 2024/0236340 A9 Jul. 11, 2024

(30) Foreign Application Priority Data

Feb. 25, 2021 (KR) .................... 10-2021-0025449

(51) Int. Cl.
*H04N 19/196* (2014.01)
*H04N 19/12* (2014.01)
(Continued)

(52) U.S. Cl.
CPC ........... *H04N 19/196* (2014.11); *H04N 19/12* (2014.11); *H04N 19/176* (2014.11);
(Continued)

(58) Field of Classification Search
None
See application file for complete search history.

(56) References Cited

U.S. PATENT DOCUMENTS

| 2013/0300591 A1 | 11/2013 | Marpe et al. |
| 2014/0307800 A1 | 10/2014 | Sole Rojals et al. |

(Continued)

FOREIGN PATENT DOCUMENTS

| KR | 10-2015-0139888 A | 12/2015 |
| KR | 10-2018-0006495 A | 1/2018 |
| KR | 10-2019-0021501 A | 3/2019 |

OTHER PUBLICATIONS

Benjamin Bross et al., "Versatile Video Coding Editorial Refinements of Draft 10", Document: JVET-T2001-v2, Joint Video Experts Team (JVET) of ITU-T SG 16 WP 3 and ISO/IEC JTC 1/SC 29, 20th Meeting, by teleconference, Oct. 7-16, 2020, pp. 1-511.

(Continued)

*Primary Examiner* — Edemio Navas, Jr.
(74) *Attorney, Agent, or Firm* — IP Legal Services, LLC

(57) ABSTRACT

A method of decoding an image according to the present disclosure includes determining whether an inverse transform is skipped to a current block, parsing information on a residual coefficient of the current block, reconstructing the residual coefficient by inversely binarizing the information and selectively applying the inverse transform to the residual coefficient. In this case, the inverse binarization may be performed based on a rice parameter for the residual coefficient and the rice parameter may be derived based on a first variable derived based on a sum of absolute values of reference residual coefficients.

13 Claims, 9 Drawing Sheets

(51) Int. Cl.
  *H04N 19/176*   (2014.01)
  *H04N 19/463*   (2014.01)
  *H04N 19/60*    (2014.01)
  *H04N 19/70*    (2014.01)
(52) U.S. Cl.
  CPC .......... *H04N 19/463* (2014.11); *H04N 19/60* (2014.11); *H04N 19/70* (2014.11)

(56) References Cited

U.S. PATENT DOCUMENTS

| | | |
|---|---|---|
| 2015/0016537 A1 | 1/2015 | Karczewicz et al. |
| 2015/0078443 A1 | 3/2015 | Kolesnikov |
| 2015/0270850 A1 | 9/2015 | Marpe et al. |
| 2016/0149588 A1 | 5/2016 | Marpe et al. |
| 2016/0308555 A1 | 10/2016 | Marpe et al. |
| 2016/0373131 A1 | 12/2016 | Marpe et al. |
| 2017/0207797 A1 | 7/2017 | Marpe et al. |
| 2018/0019762 A1 | 1/2018 | Marpe et al. |
| 2018/0034472 A1 | 2/2018 | Marpe et al. |
| 2019/0013822 A1 | 1/2019 | Marpe et al. |
| 2019/0097649 A1 | 3/2019 | Marpe et al. |
| 2019/0305795 A1 | 10/2019 | Marpe et al. |
| 2019/0334546 A1 | 10/2019 | Marpe et al. |
| 2020/0186164 A1 | 6/2020 | Marpe et al. |
| 2020/0228135 A1 | 7/2020 | Marpe et al. |
| 2020/0404286 A1* | 12/2020 | Karczewicz ........... H04N 19/44 |
| 2020/0404332 A1* | 12/2020 | Sarwer ................. H04N 19/91 |
| 2021/0028794 A1 | 1/2021 | Marpe et al. |
| 2021/0105491 A1* | 4/2021 | Karczewicz ........... H04N 19/18 |
| 2021/0203963 A1* | 7/2021 | Wang ................... H04N 19/196 |
| 2021/0352326 A1* | 11/2021 | Lim ..................... H04N 19/176 |
| 2021/0409716 A1* | 12/2021 | Choi .................... H04N 19/129 |
| 2022/0109844 A1* | 4/2022 | Pham Van ............. H04N 19/13 |
| 2022/0416810 A1 | 12/2022 | Marpe et al. |
| 2023/0291906 A1* | 9/2023 | Jhu ....................... H04N 19/124 |

OTHER PUBLICATIONS

Luong Pham Van et al., "AHG12: On the Rice parameter derivation for high bit-depth coding", Document: JVET-T0105_v2, Joint Video Experts Team (JVET) of ITU-T SG 16 WP 3 and ISO/IEC JTC 1/SC 29, 20th Meeting, by teleconference, Oct. 7-16, 2020, pp. 1-7.

Korean Intellectual Property Office, International Search Report of International Application No. PCT/KR2022/002810, Jun. 20, 2022.

Korean Intellectual Property Office, Written Opinion of International Application No. PCT/KR2022/002810, Jun. 20, 2022.

* cited by examiner

: Position of coefficient to be currently encoded

: Position of reference residual coefficient

METHOD AND DEVICE FOR ADAPTIVE SELECTION OF RICE PARAMETER FOR BINARIZING RESIDUAL COEFFICIENT IN VIDEO SIGNAL ENCODING/DECODING

CROSS REFERENCE TO RELATED APPLICATIONS

This application is a National Stage Patent Application of PCT International Patent Application No. PCT/KR2022/002810 (filed on Feb. 25, 2022) under 35 U.S.C. § 371, which claims priority to Korean Patent Application No. 10-2021-0025449 (filed on Feb. 25, 2021), the teachings of which are incorporated herein in their entireties by reference.

TECHNICAL FIELD

The present disclosure relates to a method and a device for processing a video signal.

BACKGROUND ART

Recently, demands for high-resolution and high-quality images such as HD (High Definition) images and UHD (Ultra High Definition) images have increased in a variety of application fields. As image data becomes high-resolution and high-quality, the volume of data relatively increases compared to the existing image data, so when image data is transmitted by using media such as the existing wire and wireless broadband circuit or is stored by using the existing storage medium, expenses for transmission and expenses for storage increase. High efficiency image compression technologies may be utilized to resolve these problems which are generated as image data becomes high-resolution and high-quality.

There are various technologies such as an inter prediction technology which predicts a pixel value included in a current picture from a previous or subsequent picture of a current picture with an image impression technology, an intra prediction technology which predicts a pixel value included in a current picture by using pixel information in a current picture, an entropy encoding technology which assigns a short sign to a value with high appearance frequency and assigns a long sign to a value with low appearance frequency and so on, and image data may be effectively compressed and transmitted or stored by using these image compression technologies.

On the other hand, as demands for a high-resolution image have increased, demands for stereo-scopic image contents have increased as a new image service. A video compression technology for effectively providing high-resolution and ultra high-resolution stereo-scopic image contents has been discussed.

DISCLOSURE

Technical Problem

A purpose of the present disclosure is to provide a method and a device of effectively encoding/decoding a residual coefficient in encoding/decoding a video signal.

A purpose of the present disclosure is to provide a method and a device of adaptively selecting a rice parameter for binarization of a residual coefficient in encoding/decoding a video signal.

Technical effects of the present disclosure may be non-limited by the above-mentioned technical effects, and other unmentioned technical effects may be clearly understood from the following description by those having ordinary skill in the technical field to which the present disclosure pertains.

Technical Solution

A method of decoding a video signal according to the present disclosure includes determining whether an inverse transform is skipped to a current block, parsing information on a residual coefficient of the current block, reconstructing the residual coefficient by inversely binarizing the information and selectively applying the inverse transform to the residual coefficient. In this case, the inverse binarization may be performed based on a rice parameter for the residual coefficient and the rice parameter may be derived based on a first variable derived based on a sum of absolute values of reference residual coefficients.

A method of encoding a video signal according to the present disclosure includes determining whether a transform is skipped to a current block, acquiring a residual coefficient of the current block by applying or skipping the transform, determining a syntax value for the residual coefficient and binarizing the syntax. In this case, the binarization may be performed based on a rice parameter for the residual coefficient and the rice parameter may be derived based on a first variable derived based on a sum of absolute values of reference residual coefficients.

In a method of encoding/decoding a video signal according to the present disclosure, the rice parameter may be derived based on a shifting parameter mapped to an interval to which the first variable belongs among a plurality of intervals.

In a method of encoding/decoding a video signal according to the present disclosure, the rice parameter may be derived by adding the shifting parameter to an initial rice parameter and the initial rice parameter may be obtained based on a second variable derived by scaling the first variable based on the shifting parameter.

In a method of encoding/decoding a video signal according to the present disclosure, the number of the intervals has a pre-defined value in a decoder and the pre-defined value may be 5.

In a method of encoding/decoding a video signal according to the present disclosure, the number of the intervals may be determined differently according to whether the inverse transform is skipped to the current block.

In a method of encoding/decoding a video signal according to the present disclosure, a range of each of the plurality of intervals may be determined by a threshold value.

In a method of encoding/decoding a video signal according to the present disclosure, the threshold value may be determined based on at least one of whether the inverse transform is skipped to the current block, a size of the current block, a shape of the current block or a quantization parameter of the current block.

In a method of encoding/decoding a video signal according to the present disclosure, information representing the threshold value may be explicitly signaled in a bitstream.

In a method of encoding/decoding a video signal according to the present disclosure, the rice parameter may be derived by adding a shifting parameter to an initial rice parameter and the shifting parameter may be derived based on a second variable obtained by scaling the first variable.

In a method of encoding/decoding a video signal according to the present disclosure, the shifting parameter may be derived by applying a floor function to the second variable.

In a method of encoding/decoding a video signal according to the present disclosure, the information may be a first syntax representing a difference between 4 and an absolute value of the residual coefficient or a second syntax representing an absolute value of the residual coefficient.

The characteristics which are simply summarized above for the present disclosure are just an illustrative aspect of a detailed description of the after-described present disclosure and do not limit a scope of the present disclosure.

Technical Effect

According to the present disclosure, encoding/decoding efficiency may be improved by setting an encoding method of a residual coefficient differently according to the number of bins encoded by using context information.

According to the present disclosure, encoding/decoding efficiency for a residual coefficient may be improved by adaptively selecting a rice parameter.

Effects obtainable from the present disclosure may be non-limited by the above-mentioned effect, and other unmentioned effects may be clearly understood from the following description by those having ordinary skill in the technical field to which the present disclosure pertains.

DETAILED DESCRIPTION OF THE DISCLOSURE

As the present disclosure may make various changes and have several embodiments, specific embodiments will be illustrated in a drawing and described in detail. But, it is not intended to limit the present disclosure to a specific embodiment, and it should be understood that it includes all changes, equivalents or substitutes included in an idea and a technical scope for the present disclosure. A similar reference sign is used for a similar component while describing each drawing.

A term such as first, second, etc. may be used to describe various components, but the components should not be limited by the terms. The terms are used only to distinguish one component from other components. For example, without going beyond a scope of a right of the present disclosure, a first component may be referred to as a second component and similarly, a second component may be also referred to as a first component. A term, and/or, includes a combination of a plurality of relative entered items or any item of a plurality of relative entered items.

When a component is referred to as being "linked" or "connected" to other component, it should be understood that it may be directly linked or connected to other component, but other component may exist in the middle. On the other hand, when a component is referred to as being "directly linked" or "directly connected" to other component, it should be understood that other component does not exist in the middle.

As terms used in this application are only used to describe a specific embodiment, they are not intended to limit the present disclosure. Expression of the singular includes expression of the plural unless it clearly has a different meaning contextually. In this application, it should be understood that a term such as "include" or "have", etc. is to designate the existence of characteristics, numbers, stages, motions, components, parts or their combinations entered in a specification, but is not to exclude the existence or possibility of addition of one or more other characteristics, numbers, stages, motions, components, parts or their combinations in advance.

Hereinafter, referring to the attached drawings, a desirable embodiment of the present disclosure will be described in more detail. Hereinafter, the same reference sign is used for the same component in a drawing and an overlapping description for the same component is omitted.

Figure 1:
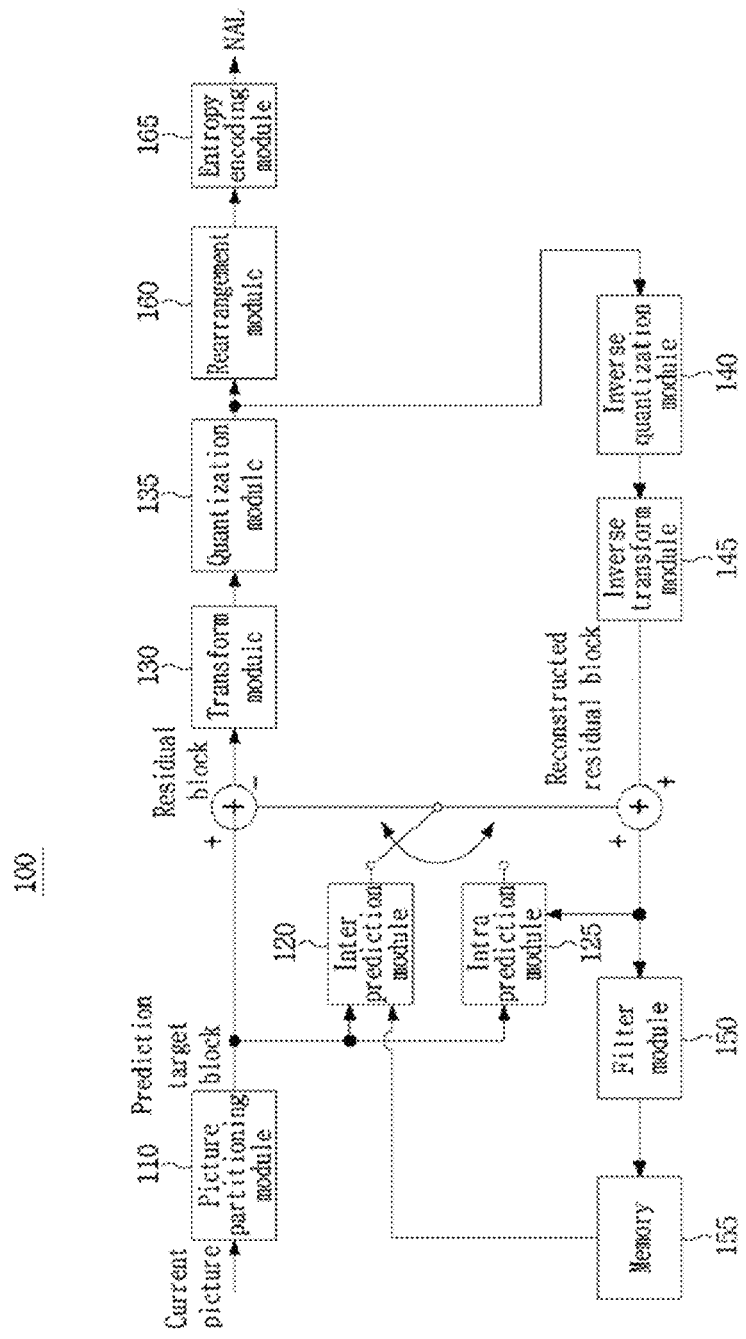
FIG. 1 is a block diagram showing an image encoding device according to an embodiment of the present disclosure.

FIG. 1 is a block diagram showing an image encoding device according to an embodiment of the present disclosure.

Referring to FIG. 1, an image encoding device 100 may include a picture partitioning unit 110, prediction units 120 and 125, a transform unit 130, a quantization unit 135, a rearrangement unit 160, an entropy encoding unit 165, a dequantization unit 140, an inverse-transform unit 145, a filter unit 150, and a memory 155.

As each construction unit in FIG. 1 is independently shown to show different characteristic functions in an image encoding device, it does not mean that each construction unit is constituted by separated hardware or one software unit. That is, as each construction unit is included by being enumerated as each construction unit for convenience of a description, at least two construction units of each construction unit may be combined to constitute one construction unit or one construction unit may be partitioned into a plurality of construction units to perform a function, and even an integrated embodiment and a separated embodiment of each construction unit are also included in a scope of a right of the present disclosure unless they are departing from essence of the present disclosure.

Further, some components may be just an optional component for improving performance, not a necessary component which perform an essential function in the present disclosure. The present disclosure may be implemented by including only a construction unit necessary for implementing essence of the present disclosure excluding a component used to just improve performance, and a structure including only a necessary component excluding an optional component used to just improve performance is also included in a scope of a right of the present disclosure.

A picture partitioning unit 110 may partition an input picture into at least one processing unit. In this connection, a processing unit may be a prediction unit (PU), a transform unit (TU), or a coding unit (CU). In a picture partitioning unit 110, one picture may be partitioned into a combination of a plurality of coding units, prediction units and transform units and a picture may be encoded by selecting a combination of one coding unit, prediction unit and transform unit according to a predetermined standard (for example, cost function).

For example, one picture may be partitioned into a plurality of coding units. In order to partition a coding unit in a picture, a recursive tree structure such as a quad tree structure may be used, and a coding unit which is partitioned into other coding units by using one image or the largest coding unit as a route may be partitioned with as many child nodes as the number of partitioned coding units. A coding unit which is no longer partitioned according to a certain restriction becomes a leaf node. In other words, when it is assumed that only square partitioning is possible for one coding unit, one coding unit may be partitioned into up to four other coding units.

Hereinafter, in an embodiment of the present disclosure, a coding unit may be used as a unit for encoding or may be used as a unit for decoding.

A prediction unit may be partitioned with at least one square or rectangular shape, etc. in the same size in one coding unit or may be partitioned so that any one prediction unit of prediction units partitioned in one coding unit can have a shape and/or a size different from another prediction unit.

In generating a prediction unit performing intra prediction based on a coding block, when it is not the smallest coding unit, intra prediction may be performed without performing partitioning into a plurality of prediction units, N×N.

Prediction units 120 and 125 may include an inter prediction unit 120 performing inter prediction and an intra prediction unit 125 performing intra prediction. Whether to perform inter prediction or intra prediction for a prediction unit may be determined and detailed information according to each prediction method (for example, an intra prediction mode, a motion vector, a reference picture, etc.) may be determined. In this connection, a processing unit that prediction is performed may be different from a processing unit that a prediction method and details are determined. For example, a prediction method, a prediction mode, etc. may be determined in a prediction unit and prediction may be performed in a transform unit. A residual value (a residual block) between a generated prediction block and an original block may be input to a transform unit 130. In addition, prediction mode information used for prediction, motion vector information, etc. may be encoded with a residual value in an entropy encoding unit 165 and may be transmitted to a decoding device. When a specific encoding mode is used, an original block may be encoded as it is and transmitted to a decoding unit without generating a prediction block through prediction units 120 or 125.

An inter prediction unit 120 may predict a prediction unit based on information on at least one picture of a previous picture or a subsequent picture of a current picture, or in some cases, may predict a prediction unit based on information on some encoded regions in a current picture. An inter prediction unit 120 may include a reference picture interpolation unit, a motion prediction unit and a motion compensation unit.

A reference picture interpolation unit may receive reference picture information from a memory 155 and generate pixel information equal to or less than an integer pixel in a reference picture. For a luma pixel, an 8-tap DCT-based interpolation filter having a different filter coefficient may be used to generate pixel information equal to or less than an integer pixel in a ¼ pixel unit. For a chroma signal, a 4-tap DCT-based interpolation filter having a different filter coefficient may be used to generate pixel information equal to or less than an integer pixel in a ⅛ pixel unit.

A motion prediction unit may perform motion prediction based on a reference picture interpolated by a reference picture interpolation unit. As a method for calculating a motion vector, various methods such as FBMA (Full search-based Block Matching Algorithm), TSS (Three Step Search), NTS (New Three-Step Search Algorithm), etc. may be used. A motion vector may have a motion vector value in a unit of a ½ or ¼ pixel based on an interpolated pixel. A motion prediction unit may predict a current prediction unit by varying a motion prediction method. As A motion prediction method, various methods such as a skip method, a merge method, an advanced motion vector prediction (AMVP) method, an intra block copy method, etc. may be used.

An intra prediction unit 125 may generate a prediction unit based on reference pixel information around a current block, which is pixel information in a current picture. When a neighboring block in a current prediction unit is a block which performed inter prediction and thus, a reference pixel is a pixel which performed inter prediction, a reference pixel included in a block which performed inter prediction may be used by being replaced with reference pixel information of a surrounding block which performed intra prediction. In other words, when a reference pixel is unavailable, unavailable reference pixel information may be used by being replaced with at least one reference pixel of available reference pixels.

A prediction mode in intra prediction may have a directional prediction mode using reference pixel information according to a prediction direction and a non-directional mode not using directional information when performing prediction. A mode for predicting luma information may be different from a mode for predicting chroma information and intra prediction mode information used for predicting luma information or predicted luma signal information may be utilized to predict chroma information.

When a size of a prediction unit is the same as that of a transform unit in performing intra prediction, intra prediction for a prediction unit may be performed based on a pixel at a left position of a prediction unit, a pixel at a top-left position and a pixel at a top position. However, when a size of a prediction unit is different from that of a transform unit in performing intra prediction, intra prediction may be performed by using a reference pixel based on a transform unit. In addition, intra prediction using N×N partitioning may be used only for the smallest coding unit.

In an intra prediction method, a prediction block may be generated after applying an adaptive intra smoothing (AIS) filter to a reference pixel according to a prediction mode. A type of an AIS filter applied to a reference pixel may be different. In order to perform an intra prediction method, an intra prediction mode in a current prediction unit may be predicted from an intra prediction mode in a prediction unit around a current prediction unit. When a prediction mode in a current prediction unit is predicted by using mode information predicted from a surrounding prediction unit, information that a prediction mode in a current prediction unit is the same as a prediction mode in a surrounding prediction unit may be transmitted by using predetermined flag information if an intra prediction mode in a current prediction unit is the same as an intra prediction mode in a surrounding prediction unit and prediction mode information of a current block may be encoded by performing entropy encoding if a prediction mode in a current prediction unit is different from a prediction mode in a surrounding prediction unit.

In addition, a residual block may be generated which includes information on a residual value that is a difference value between a prediction unit which performed prediction based on a prediction unit generated in prediction units 120 and 125 and an original block in a prediction unit. A generated residual block may be input to a transform unit 130.

A transform unit 130 may transform an original block and a residual block which includes residual value information in a prediction unit generated through prediction units 120 and 125 by using a transform method such as DCT (Discrete Cosine Transform), DST (Discrete Sine Transform), KLT. Whether to apply DCT, DST or KLT to transform a residual block may be determined based on an intra prediction mode information in a prediction unit which is used to generate a residual block.

A quantization unit 135 may quantize values transformed into a frequency domain in a transform unit 130. A quantization coefficient may be changed according to a block or importance of an image. A value calculated in a quantization unit 135 may be provided to a dequantization unit 140 and a rearrangement unit 160.

A rearrangement unit 160 may perform rearrangement on coefficient values for a quantized residual value.

A rearrangement unit 160 may change a coefficient in a shape of a two-dimensional block into a shape of a one-dimensional vector through a coefficient scan method. For example, a rearrangement unit 160 may scan from a DC coefficient to a coefficient in a high frequency domain by using a zig-zag scan method and change it into a shape of a one-dimensional vector. According to a size of a transform unit and an intra prediction mode, instead of a zig-zag scan, a vertical scan where a coefficient in a shape of a two-dimensional block is scanned in a column direction or a horizontal scan where a coefficient in a shape of a two-dimensional block is scanned in a row direction may be used. In other words, which scan method among a zig-zag scan, a vertical directional scan and a horizontal directional scan will be used may be determined according to a size of a transform unit and an intra prediction mode.

An entropy encoding unit 165 may perform entropy encoding based on values calculated by a rearrangement unit 160. Entropy encoding may use various encoding methods such as exponential Golomb, CAVLC (Context-Adaptive Variable Length Coding), CABAC (Context-Adaptive Binary Arithmetic Coding).

An entropy encoding unit 165 may encode a variety of information such as residual value coefficient information in a coding unit and block type information, prediction mode information, partitioning unit information, prediction unit information and transmission unit information, motion vector information, reference frame information, block interpolation information, filtering information, etc. from a rearrangement unit 160 and prediction units 120 and 125.

An entropy encoding unit 165 may perform entropy encoding for a coefficient value in a coding unit which is input from a rearrangement unit 160.

A dequantization unit 140 and an inverse transform unit 145 perform dequantization for values quantized in a quantization unit 135 and perform inverse transform on values transformed in a transform unit 130. A residual value generated by a dequantization unit 140 and an inverse transform unit 145 may be combined with a prediction unit predicted by a motion prediction unit, a motion compensation unit and an intra prediction unit included in prediction units 120 and 125 to generate a reconstructed block.

A filter unit 150 may include at least one of a deblocking filter, an offset correction unit and an adaptive loop filter (ALF).

A deblocking filter may remove block distortion which is generated by a boundary between blocks in a reconstructed picture. In order to determine whether deblocking is performed, whether a deblocking filter is applied to a current block may be determined based on a pixel included in several rows or columns included in a block. When a deblocking filter is applied to a block, a strong filter or a weak filter may be applied according to required deblocking filtering strength. In addition, in applying a deblocking filter, when horizontal filtering and vertical filtering are performed, horizontal directional filtering and vertical directional filtering may be set to be processed in parallel.

An offset correction unit may correct an offset with an original image in a unit of a pixel for an image that deblocking was performed. In order to perform offset correction for a specific picture, a region where an offset will be performed may be determined after dividing a pixel included in an image into the certain number of regions and a method in which an offset is applied to a corresponding region or a method in which an offset is applied by considering edge information of each pixel may be used.

Adaptive loop filtering (ALF) may be performed based on a value obtained by comparing a filtered reconstructed image with an original image. After a pixel included in an image is divided into predetermined groups, filtering may be discriminately performed per group by determining one filter which will be applied to a corresponding group. Information related to whether ALF will be applied may be transmitted per coding unit (CU) for a luma signal and a shape and a filter coefficient of an ALF filter to be applied may vary according to each block. In addition, an ALF filter in the same shape (fixed shape) may be applied regardless of a feature of a block to be applied.

A memory 155 may store a reconstructed block or picture calculated through a filter unit 150 and a stored reconstructed block or picture may be provided to prediction units 120 and 125 when performing inter prediction.

Figure 2:
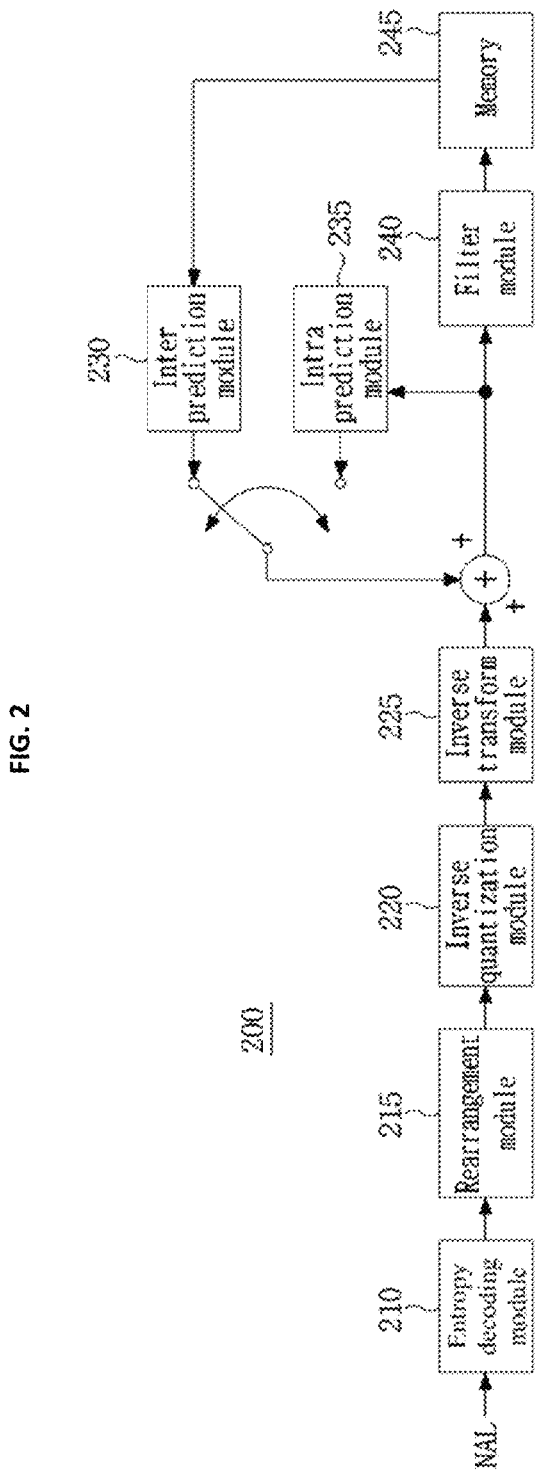
FIG. 2 is a block diagram showing an image decoding device according to an embodiment of the present disclosure.

FIG. 2 is a block diagram showing an image decoding device according to an embodiment of the present disclosure.

Referring to FIG. 2, an image decoding device 200 may include an entropy decoding unit 210, a rearrangement unit 215, a dequantization unit 220, an inverse transform unit 225, prediction units 230 and 235, a filter unit 240, and a memory 245.

When an image bitstream is input from an image encoding device, an input bitstream may be decoded according to a procedure opposite to an image encoding device.

An entropy decoding unit 210 may perform entropy decoding according to a procedure opposite to a procedure in which entropy encoding is performed in an entropy encoding unit of an image encoding device. For example, in response to a method performed in an image encoding device, various methods such as Exponential Golomb, CAVLC (Context-Adaptive Variable Length Coding), CABAC (Context-Adaptive Binary Arithmetic Coding) may be applied.

An entropy decoding unit 210 may decode information related to intra prediction and inter prediction performed in an encoding device.

A rearrangement unit 215 may perform rearrangement based on a method that a bitstream entropy-decoded in an entropy decoding unit 210 is rearranged in an encoding unit. Coefficients represented in a form of a one-dimensional vector may be rearranged by being reconstructed into coefficients in a form of a two-dimensional block. A rearrangement unit 215 may receive information related to a coefficient scan performed in an encoding unit and perform rearrangement through a method in which a scan is inversely performed based on a scan order performed in a corresponding encoding unit.

A dequantization unit 220 may perform dequantization based on a quantization parameter provided from an encoding device and a coefficient value of a rearranged block.

An inverse transform unit 225 may perform transform performed in a transform unit, i.e., inverse transform for DCT, DST, and KLT, i.e., inverse DCT, inverse DST and inverse KLT for a result of quantization performed in an image encoding device. Inverse transform may be performed based on a transmission unit determined in an image encoding device. In an inverse transform unit 225 of an image decoding device, a transform technique (for example, DCT, DST, KLT) may be selectively performed according to a plurality of information such as a prediction method, a size of a current block, a prediction direction, etc.

Prediction units 230 and 235 may generate a prediction block based on information related to generation of a prediction block provided from an entropy decoding unit 210 and pre-decoded block or picture information provided from a memory 245.

As described above, when a size of a prediction unit is the same as a size of a transform unit in performing intra prediction in the same manner as an operation in an image encoding device, intra prediction for a prediction unit may be performed based on a pixel at a left position of a prediction unit, a pixel at a top-left position and a pixel at a top position, but when a size of a prediction unit is different from a size of a transform unit in performing intra prediction, intra prediction may be performed by using a reference pixel based on a transform unit. In addition, intra prediction using N×N partitioning may be used only for the smallest coding unit.

Prediction units 230 and 235 may include a prediction unit determination unit, an inter prediction unit and an intra prediction unit. A prediction unit determination unit may receive a variety of information such as prediction unit information, prediction mode information of an intra prediction method, motion prediction-related information of an inter prediction method, etc. which are input from an entropy decoding unit 210, divide a prediction unit in a current coding unit and determine whether a prediction unit performs inter prediction or intra prediction. An inter prediction unit 230 may perform inter prediction for a current prediction unit based on information included in at least one picture of a previous picture or a subsequent picture of a current picture including a current prediction unit by using information necessary for inter prediction in a current prediction unit provided from an image encoding device. Alternatively, inter prediction may be performed based on information on some regions which are pre-reconstructed in a current picture including a current prediction unit.

In order to perform inter prediction, whether a motion prediction method in a prediction unit included in a corresponding coding unit is a skip mode, a merge mode, an AMVP mode, or an intra block copy mode may be determined based on a coding unit.

An intra prediction unit 235 may generate a prediction block based on pixel information in a current picture. When a prediction unit is a prediction unit which performed intra prediction, intra prediction may be performed based on intra prediction mode information in a prediction unit provided from an image encoding device. Alternatively, an intra prediction unit 235 may perform intra prediction based on a palette mode and it will be described in detail by referring to FIG. 3 to FIG. 28. An intra prediction unit 235 may include an adaptive intra smoothing (AIS) filter, a reference pixel interpolation unit and a DC filter. As a part performing filtering on a reference pixel of a current block, an AIS filter may be applied by determining whether a filter is applied according to a prediction mode in a current prediction unit. AIS filtering may be performed for a reference pixel of a current block by using AIS filter information and a prediction mode in a prediction unit provided from an image encoding device. When a prediction mode of a current block is a mode which does not perform AIS filtering, an AIS filter may not be applied.

When a prediction mode in a prediction unit is a prediction unit which performs intra prediction based on a pixel value which interpolated a reference pixel, a reference pixel interpolation unit may interpolate a reference pixel to generate a reference pixel in a unit of a pixel equal to or less than an integer value. When a prediction mode in a current prediction unit is a prediction mode which generates a prediction block without interpolating a reference pixel, a reference pixel may not be interpolated. A DC filter may generate a prediction block through filtering when a prediction mode of a current block is a DC mode.

A reconstructed block or picture may be provided to a filter unit 240. A filter unit 240 may include a deblocking filter, an offset correction unit and ALF.

Information on whether a deblocking filter was applied to a corresponding block or picture and information on whether a strong filter or a weak filter was applied when a deblocking filter was applied may be provided from an image encoding device. Information related to a deblocking filter provided from an image encoding device may be provided in a deblocking filter of an image decoding device and deblocking filtering for a corresponding block may be performed in an image decoding device.

An offset correction unit may perform offset correction on a reconstructed image based on offset value information, a type of offset correction applied to an image when performing encoding.

ALF may be applied to a coding unit based on information on whether ALF is applied, ALF coefficient information, etc. provided from an encoding device. Such ALF information may be provided by being included in a specific parameter set.

A memory 245 may store a reconstructed picture or block for use as a reference picture or a reference block and provide a reconstructed picture to an output unit.

As described above, hereinafter, in an embodiment of the present disclosure, a coding unit is used as a term of a coding unit for convenience of a description, but it may be a unit which performs decoding as well as encoding.

In addition, as a current block represents a block to be encoded/decoded, it may represent a coding tree block (or a coding tree unit), a coding block (or a coding unit), a transform block (or a transform unit) or a prediction block (or a prediction unit), etc. according to an encoding/decoding step. In this specification, 'a unit' may represent a base unit for performing a specific encoding/decoding process and 'a block' may represent a pixel array in a predetermined size. Unless otherwise classified, 'a block' and 'a unit' may be used interchangeably. For example, in the after-described embodiment, it may be understood that a coding block (a coding block) and a coding unit (a coding unit) are used interchangeably.

An image may be encoded/decoded in a unit of a block. A coding block may be recursively partitioned based on a tree structure. In an example, a coding block may be partitioned by at least one of quad tree partitioning, binary tree partitioning or ternary tree partitioning.

In addition, a coding block may be partitioned into a plurality of prediction blocks or a plurality of transform blocks.

After performing prediction for a current block, a residual block may be obtained by subtracting an original block and a prediction block. When a residual block is obtained, a residual coefficient may be obtained by performing at least one of transform or quantization fora residual block.

Information representing whether transform is applied to a current block may be encoded and signaled. In an example, transform_skip_flag may be encoded and signaled. When transform_skip_flag is 1, it represents that transform is not applied to a current block. Here, transform may include second transform as well as first transform which will be described later. When transform_skip_flag is 0, it represents that transform is applied to a current block. When transform_skip_flag is 0, first transform is necessarily applied to a current block, while second transform may be optionally applied.

Transform may be performed based on at least one of a DCT-based transform kernel or a DST-based transform kernel. Here, a DCT-based transform kernel may include at least one of DCT-2 or DCT-8 and a DST-based transform kernel may include DST-7. Additional transform may be applied to a result of transforming a residual sample. Transform performed by a DCT or DST-based transform kernel is referred to as first transform and transform additionally applied to a result of first transform is referred to as second transform.

Quantization may be selectively applied to a transform coefficient and subsequently, information related to a residual coefficient may be encoded. Here, a residual coefficient may mean at least one of a quantized transform coefficient, a transform coefficient or a quantized residual sample according to whether transform or quantization is applied. A residual coefficient may be referred to as a residual signal.

In a decoder, a residual sample may be reconstructed through an inverse process of an encoder. Specifically, after acquiring a residual coefficient, a residual sample may be obtained by performing dequantization and/or inverse transform to an obtained residual coefficient. In this case, inverse transform may include at least one of first inverse transform, an inverse process of first transform, and second inverse transform, an inverse process of second transform.

In order to encode/decode a residual coefficient, a variety of syntaxes may be used. In addition, syntaxes regarding the residual coefficient may be entropy-encoded and signaled in a bitstream. In this case, after partitioning a current block into at least one or more sub-blocks, entropy encoding/decoding for a residual coefficient may be performed in a unit of a sub-block.

Hereinafter, a process of encoding/decoding a residual coefficient is described in detail.

A flag representing whether a non-zero residual coefficient exists in a current block may be encoded and signaled. When a non-zero residual coefficient exists in a current block, a position of a last non-zero residual coefficient in scan order may be encoded.

In addition, a sub-block flag representing whether a non-zero residual coefficient exists in a sub-block may be encoded in a unit of a sub-block in a current block. When a non-zero residual coefficient exists in a sub-block, information on each residual coefficient may be additionally encoded in scan order.

In this case, encoding of a sub-block flag may be omitted for a sub-block which is scanned before a sub-block including a last non-zero residual coefficient. As a non-zero residual coefficient is not included in the sub-block, a value of a sub-block flag may be inferred to 0.

In addition, encoding of a sub-block flag may be omitted for a sub-block including a last non-zero residual coefficient. As a non-zero residual coefficient is necessarily included in the sub-block, a value of a sub-block flag may be inferred to 1.

In another example, encoding of position information of a last non-zero residual coefficient may be omitted. When encoding of position information of a last non-zero residual coefficient is omitted, a sub-block flag may be encoded for all sub-blocks in a current block.

In this case, when it is determined that a non-zero residual coefficient is not included in remaining sub-blocks excluding a sub-block with last scan order, it may be understood that a non-zero residual coefficient should be included in a last sub-block. Accordingly, encoding of a sub-block flag may be omitted for a last sub-block and that value may be inferred to 1.

Information representing whether position information of a last non-zero coefficient is encoded may be additionally encoded. When position information of a last non-zero coefficient is encoded, a value of the information may be set as 1. In this case, a sub-block flag may be encoded from a sub-block that a last non-zero coefficient exists. On the other hand, when position information of a last non-zero coefficient is not encoded, a value of the information may be set as 0. In this case, a sub-block flag may be encoded from a sub-block which is scanned first.

When there is a non-zero residual coefficient in a current block, it may be assumed that for a first sub-block in the current block, a non-zero residual coefficient is necessarily included. Accordingly, encoding of a sub-block flag representing whether a non-zero residual coefficient exists may be omitted for a first sub-block.

Information on each residual coefficient may include at least one of a flag representing whether a residual coefficient has a non-zero value, information representing a size of a residual coefficient and information representing a sign of a residual coefficient.

Residual coefficients may be encoded in predetermined scan order. In this case, encoding order of residual coefficients may be different based on whether transform is skipped in a current block. In an example, when transform is not skipped in a current block, a residual coefficient at a bottom-right position in a sub-block may be encoded first and a residual coefficient at a top-left position may be encoded last. In other words, scan order between residual coefficients may be determined according to an inverse-diagonal scan, an inverse-horizontal scan or an inverse-vertical scan. On the other hand, when transform is skipped in a current block, a residual coefficient at a top-left position in a sub-block may be encoded first and a residual coefficient at a bottom-right position may be encoded last. In other words, scan order between residual coefficients may be determined according to a diagonal scan, a horizontal scan or a vertical scan.

Alternatively, even when transform is skipped in a current block, scan order between residual coefficients may be determined according to an inverse-diagonal scan, an inverse-horizontal scan or an inverse-vertical scan.

Scan order of residual coefficients may be predefined in an encoder and a decoder. Alternatively, information representing scan order of residual coefficients may be encoded and signaled. Alternatively, scan order may be determined based on at least one of a size or a shape of a current block, an intra prediction mode, whether transform is skipped or whether second transform is performed. In an example, when transform is skipped to a current block, residual coefficients may be encoded/decoded in diagonal (or inverse-diagonal) scan order and when transform is not skipped to a current block, residual coefficients may be encoded/decoded in inverse-diagonal (or diagonal) scan order.

Figure 3:
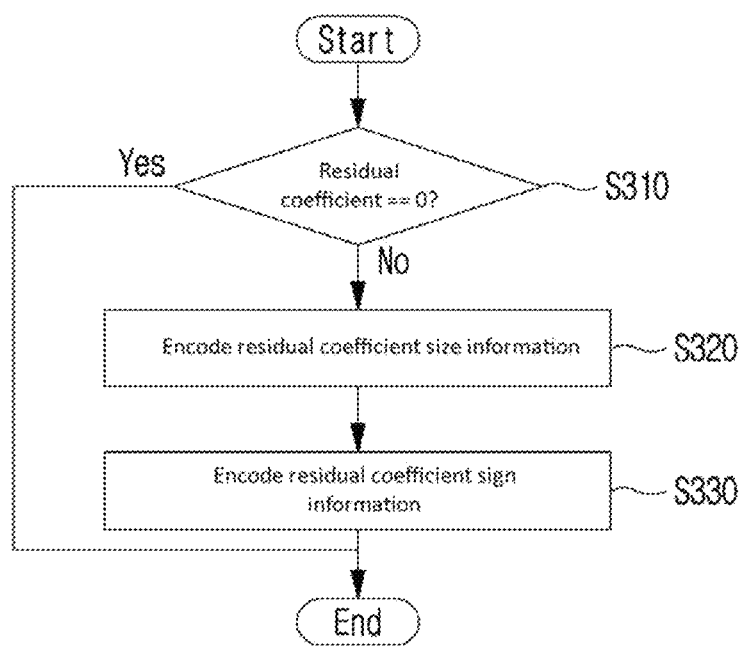
FIG. 3 is a flow chart representing a process of encoding a residual coefficient in an encoder.

FIG. 3 is a flow chart representing a process of encoding a residual coefficient in an encoder.

First, sig_coeff_flag, a flag representing whether a residual coefficient has a non-zero value, may be encoded S310. When a value of a residual coefficient is 0, a value of a flag, sig_coeff_flag, may be set as 0 and encoded. On the other hand, when a value of a residual coefficient is not 0, a value of a flag, sig_coeff_flag, may be set as 1 and encoded. When a value of a residual coefficient is not 0, size information of a residual coefficient may be further encoded S320.

Figure 4:
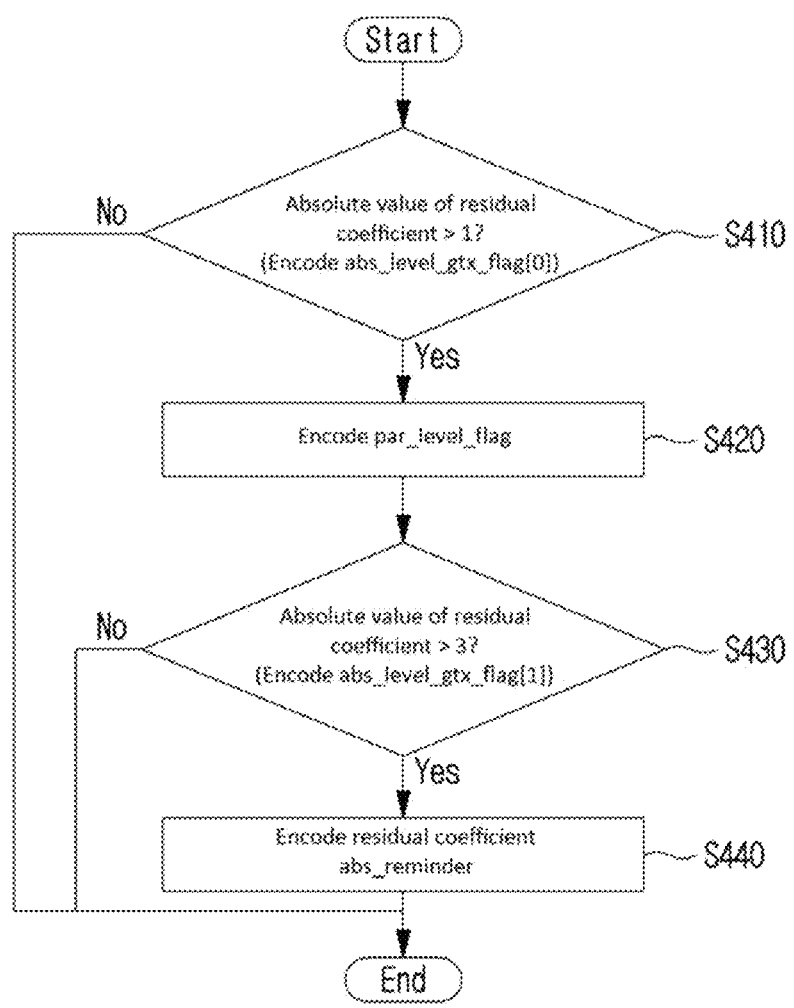
FIG. 4 is a flow chart representing a process of encoding size information of a residual coefficient.

FIG. 4 is a flow chart representing a process of encoding size information of a residual coefficient.

An absolute value of a residual coefficient may be encoded by using at least one abs_level_gtx_flag[N]. In this case, N may be an integer equal to or greater than 0. A flag, abs_level_gtx_flag[N], may represent whether an absolute value of a residual coefficient has a value greater than (2N+1). The number of abs_level_gtx_flag[N] used to encode an absolute value of a residual coefficient may be determined based on whether transform was skipped in a current block. In an example, when transform is not skipped in a current block, 2 abs_level_gtx_flag[N] (N is from 0 to 1) may be used. On the other hand, when transform is skipped in a current block, 3 or more abs_level_gtx_flag[N] (e.g., 3, 4, or 5) may be used. In this embodiment, it is assumed that 2 abs_level_gtx_flag[N] are used.

abs_level_gtx_flag[0], a flag representing whether an absolute value of a residual coefficient is greater than 1, may be encoded S410. When an absolute value of a residual coefficient is 1, a value of a flag, abs_level_gtx_flag[0], may be set as 0 and encoded. On the other hand, when an absolute value of a residual coefficient is greater than 1, a value of a flag, abs_level_gtx_flag[0], may be set as 1 and encoded.

When an absolute value of a residual coefficient is greater than 1, par_level_flag, a flag representing whether an absolute value of a residual coefficient is an even number or an odd number, may be encoded S420. When an absolute value of a residual coefficient is an even number, a flag, par_level_flag, may be set as 0 and encoded. On the other hand, when an absolute value of a residual coefficient is an odd number, a flag, par_level_flag, may be set as 1 and encoded. Alternatively, conversely, when an absolute value of a residual coefficient is an even number, a flag, par_level_flag, may be set as 1 and when an absolute value of a residual coefficient is an odd number, a flag, par_level_flag, may be set as 0.

Next, abs_level_gtx_flag[1], a flag representing whether an absolute value of a residual coefficient is greater than 3, may be encoded S430. When an absolute value of a residual coefficient is equal to or less than 3, a value of a flag, abs_level_gtx_flag[1], may be set as 0. On the other hand, when an absolute value of a residual coefficient is greater than 0, a value of a flag, abs_level_gtx_flag[1], may be set as 1.

When an absolute value of a residual coefficient is greater than 3, abs_remainder representing a residual size may be encoded S440. A syntax, abs_remainder, may be derived by shifting a value derived by subtracting 4 from an absolute value of a residual coefficient by 1 to the right.

Besides a flag, abs_level_gtx_flag[0] and abs_level_gtx_flag[1], shown in FIG. 4, abs_level_gtx_flag[N] such as abs_level_gtx_flag[2], abs_level_gtx_flag[3] or abs_level_gtx_flag[4], etc. may be additionally encoded. In this case, only when a value of abs_level_gtx_flag[N−1] is 1, abs_level_gtx_flag[N] may be additionally encoded/decoded. [0125] abs_level_gtx_flag[N] may represent whether an absolute value of a residual coefficient has a value greater than (2N+1). When abs_level_gtx_flag[N] is used, abs_remainder may be derived by shifting a value derived by subtracting 2(N+1) from an absolute value of a residual coefficient by 1 to the right.

In the above-described example, it was illustrated that an absolute value of a residual coefficient is encoded by using sig_coeff_flag, abs_level_gtx_flag[0], par_level_flag, abs_level_gtx_flag[1] and abs_reminder. In another example, an absolute value of a residual coefficient may be encoded as it is. In an example, dec_abs_level, a syntax representing an absolute value of a residual coefficient, may be encoded. A method of selecting a method in which an absolute value of a residual coefficient is encoded will be described after.

After encoding size information of a residual coefficient, coeff_sign_flag, a flag representing a sign of a residual coefficient, may be encoded s330. When a value of a flag, coeff_sign_flag, is 0, it represents that a residual coefficient is a positive number. On the other hand, when a value of a flag, coeff_sign_flag, is 1, it represents that a residual coefficient is a negative number.

Figure 5:
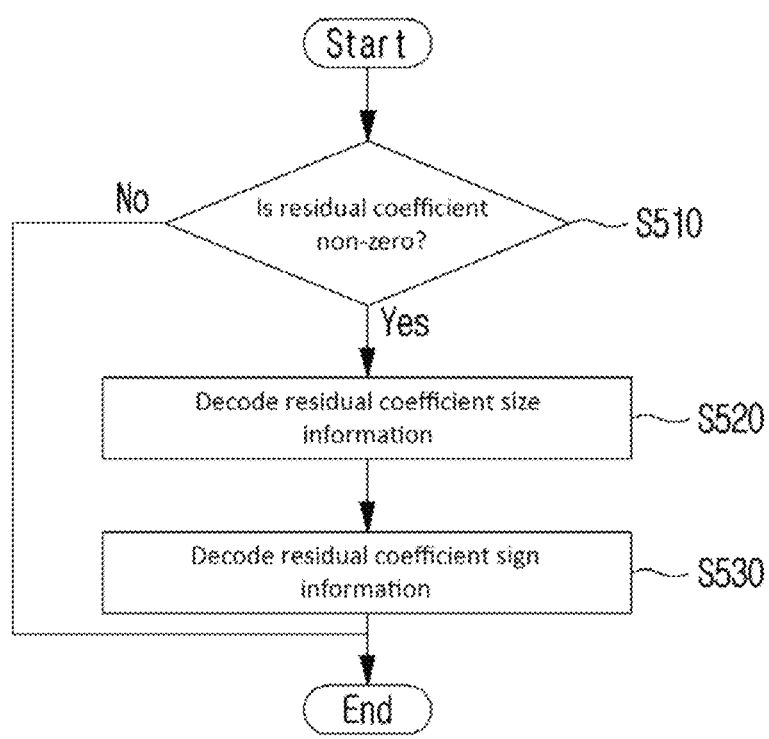
FIG. 5 is a flow chart representing a process of decoding a residual coefficient in an decoder.

FIG. 5 is a flow chart representing a process of decoding a residual coefficient in a decoder.

When it is determined that a non-zero residual coefficient is included in a sub-block, residual coefficients may be reconstructed based on predetermined scan order.

First, sig_coeff_flag, a flag representing whether a residual coefficient has a non-zero value, may be decoded S510. When a value of a flag, sig_coeff_flag, is 0, it represents that a value of a residual coefficient is 0. On the other hand, when a value of a flag, sig_coeff_flag, is 1, it represents that a value of a residual coefficient is not 0. When a value of a flag, sig_coeff_flag, is 1, size information of a residual coefficient may be further decoded S520.

Figure 6:
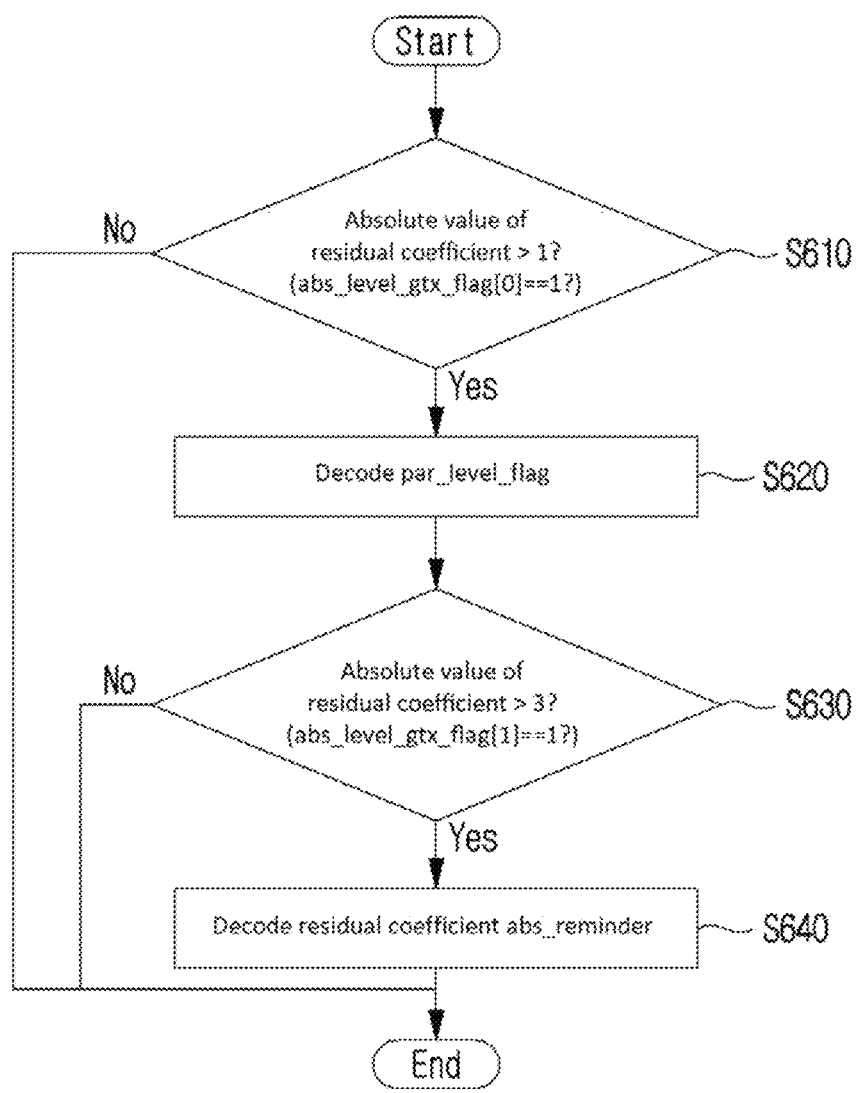
FIG. 6 is a diagram representing a process of decoding size information of a residual coefficient.

FIG. 6 is a diagram representing a process of decoding size information of a residual coefficient.

For convenience of a description, it is assumed that a residual coefficient is encoded by using up to 2 abs_level_gtx_flag[N].

abs_level_gtx_flag[0], a flag representing whether an absolute value of a residual coefficient is greater than 1, may be decoded S610. When a value of a flag, abs_level_gtx_flag[0], is 0, it represents that an absolute value of a residual coefficient is 1. On the other hand, when a value of a flag, abs_level_gtx_flag[0], is 1, it represents that an absolute value of a residual coefficient is greater than 1.

When a value of a flag, abs_level_gtx_flag[0], is 1, par_level_flag, a flag representing whether an absolute value of a residual coefficient is an even number or an odd number, may be decoded S620. When a value of a flag, par_level_flag, is 0, it represents that an absolute value of a residual coefficient is an even number and when a value of a flag, par_level_flag, is 1, it represents that an absolute value of a residual coefficient is an odd number.

Next, abs_level_gtx_flag[1], a flag representing whether an absolute value of a residual coefficient is greater than 3, may be decoded S630. When a value of a flag, abs_level_gtx_flag[1], is 0, it represents that an absolute value of a residual coefficient is smaller than 3. When a value of a flag, abs_level_gtx_flag[1], is 0, an absolute value of a residual coefficient may be determined as 2 or 3 according to a value of a flag, par_level_flag.

When a value of a flag, abs_level_gtx_flag[1], is 1, it represents that an absolute value of a residual coefficient is greater than 3.

When a value of a flag, abs_level_gtx_flag[1], is 1, abs_reminder representing a residual size may be decoded S640. An absolute value of a residual coefficient may be derived by adding 3 or 4 to a value derived by shifting a value represented by a syntax, abs_reminder, by 1 to the left.

Besides a flag, abs_level_gtx_flag[0] and abs_level_gtx_flag[1], shown in FIG. 6, abs_level_gtx_flag[N] such as abs_level_gtx_flag[2], abs_level_gtx_flag[3] or abs_level_gtx_flag[4], etc. may be additionally decoded. In this case, when a value of abs_level_gtx_flag[N] is 1, abs_level_gtx_flag[N+1] may be additionally decoded. [0140] abs_level_gtx_flag[N] may represent whether an absolute value of a residual coefficient has a value greater than (2N+1). When abs_level_gtx_flag[0] is used, abs_reminder may be set as a value derived by shifting a value derived by subtracting 2(N+1) from an absolute value of a residual coefficient by 1 to the right.

In the above-described example, it was illustrated that an absolute value of a residual coefficient is decoded by using sig_coeff_flag, abs_level_gtx_flag[0], par_level_flag, abs_level_gtx_flag[1] and abs_reminder. In another example, an absolute value of a residual coefficient may be decoded as it is. In an example, dec_abs_level, a syntax representing an absolute value of a residual coefficient, may be decoded. A method of selecting a method in which an absolute value of a residual coefficient is decoded will be described after.

After decoding size information of a residual coefficient, coeff_sign_flag, a flag representing a sign of a residual coefficient, may be decoded S530. When a value of a flag, coeff_sign_flag, is 0, it represents that a residual coefficient is a positive number. On the other hand, when a value of a flag, coeff_sign_flag, is 1, it represents that a residual coefficient is a negative number.

As described, a residual coefficient may be encoded by at least one syntax. A residual coefficient may be changed into a plurality of bins in a binarization process of syntax(es) and changed bins may be encoded by entropy encoding.

Entropy encoding may be divided into encoding using context information and encoding not using context information. Context represents a probability that a value of a bin is 0 or 1.

Here, an encoding/decoding method using context information may be referred to as context coding and an encoding/decoding method not using context information may be referred to as bypass coding.

In order to increase throughput of an entropy encoding unit 165 and an entropy decoding unit 210, the number of bins encoded by using context information may be limited. In order to limit the number of bins encoded by using context information, a threshold value may be set. A threshold value may be referred to as a Coded Context Bin (CCB). For a bin whose count value is smaller than a threshold value among generated bins, encoding using context information is performed. When a count value is equal to or exceeds a threshold value, encoding using context information may not be used any more.

A threshold value may be adaptively determined in an encoder/a decoder. In an example, a threshold value may be determined based on at least one of a size or a shape of a current block, the number of non-zero residual coefficients in a current block, whether transform is skipped to a current block, a type of a transform kernel applied to a current block, whether quantization is applied to a current block, a color component (e.g., Y, Cb, Cr), a quantization parameter of a current block or a bit depth.

In an example, a threshold value may be determined based on the number of non-zero residual coefficients in a current block. Specifically, a value multiplying the number of non-zero residual coefficients in a current block by a real number or a value adding or subtracting an offset may be set as a threshold value.

In an example, a threshold value may be determined based on the number of pixels included in a current block. Specifically, a value multiplying the number of pixels in a current block by a real number or a value adding or subtracting an offset may be set as a threshold value.

In an example, a threshold value may be determined based on at least one of a size or a shape of a current block. Specifically, at least one threshold value candidate may be pre-defined per size and/or shape of a block. In this case, a threshold value candidate of a current block may be selected from at least one threshold value candidate corresponding to a size and/or a shape of a current block. When a plurality of threshold value candidates correspond to a size and/or a shape of a current block, index information for specifying one of a plurality of threshold value candidates may be additionally encoded/decoded.

In an example, a threshold value may be determined based on at least one of whether transform skip is applied, a transform kernel applied to a current block or a quantization parameter.

Alternatively, information representing a threshold value may be signaled in a bitstream. The information may be encoded through a higher header such as a sequence, a picture header or a slice header.

Alternatively, a threshold value may be fixed in an encoder/a decoder.

As described above, according to whether transform is skipped to a current block, at least one of scan order for encoding/decoding a residual coefficient, the number of gt_N_flag or the number of bins encoded/decoded by using context information (i.e., a threshold value) may be different. When transform is applied to a current block (i.e., when transform is not skipped), encoding/decoding a residual coefficient may be referred to as a residual coding (RC) method. On the other hand, when transform is not applied to a current block (i.e., when transform is skipped), encoding/decoding a residual coefficient may be referred to as a Transform Skip Residual Coding (TSRC) method. Hereinafter, a method of encoding a residual coefficient in a RC method and a TSRC method is described in detail.

Figure 7:
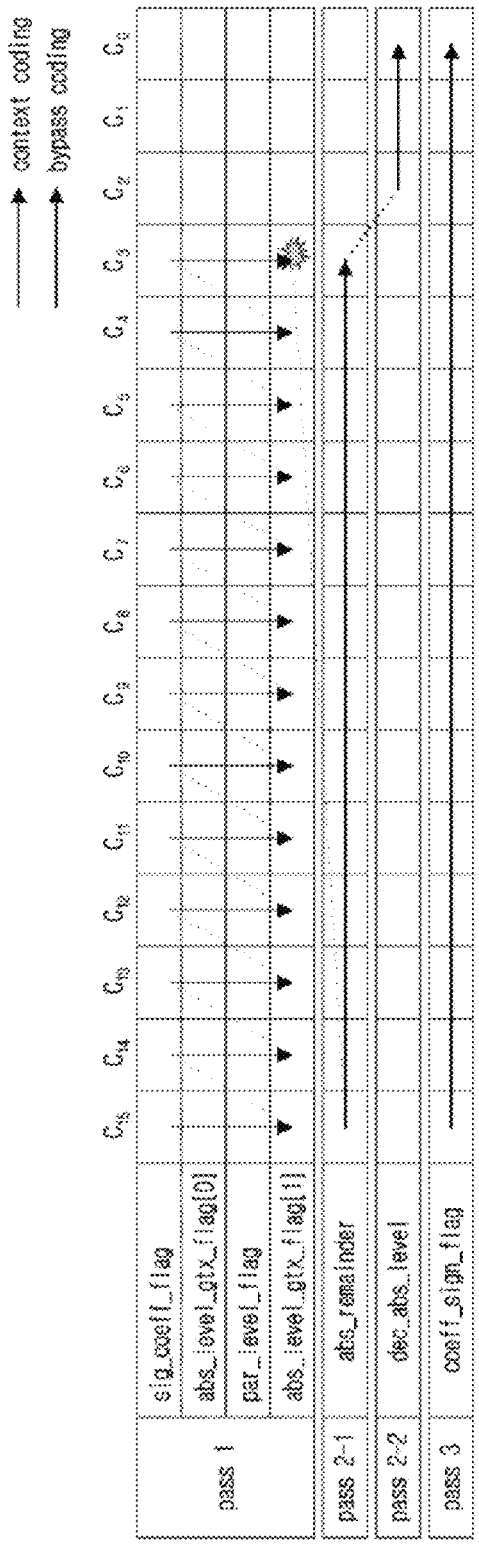
FIG. 7 represents an example in which a residual coefficient is encoded/decoded under a RC method.

FIG. 7 represents an example in which a residual coefficient is encoded/decoded under a RC method.

For convenience of a description, it is assumed that a residual coefficient is encoded/decoded in a unit of a 4×4-sized sub-block. In addition, it is assumed that the maximum number of bins encoded/decoded by using context information (i.e., a threshold value) is 52.

When a RC method is applied, a residual coefficient may be encoded/decoded according to an inverse-diagonal scan direction from a bottom-right residual coefficient to top-left residual coefficient in a sub-block. In FIG. 7, C15 represents a residual coefficient at a bottom-right position in a sub-block and C0 represents a residual coefficient at a top-left position in a sub-block.

In addition, in FIG. 7, an arrow with a thin solid line represents bins encoded/decoded by using context information and an arrow with a thick solid line represents bins encoded/decoded without using context information. In addition, a connection line between arrows represents encoding/decoding order of each syntax.

Under a RC method, up to 2 abs_level_gtx_flag[N] may be used.

TABLE 1

| Pass | Syntax Name | Formula |
| --- | --- | --- |
| pass 1 | sig_coeff_flag | $C_N != 0$ |
|  | abs_level_gtx_flag[0] | $!!\ (\ |C_N| - 1\ )$ |
|  | par_level_flag | $(\ |C_N| - 2\ )\ \&\ 1$ |
|  | abs_level_gtx_flag[1] | $(\ |C_N| - 2\ ) >> 1$ |
| pass 2-1 | abs_remainder | $(\ |C_N| - 4\ ) >> 1$ |
| pass 2-2 | dec_abs_level | $|C_N|$ |
| pass 3 | coeff_sign_flag | $C_N < 0\ ?\ 1 : 0$ |

Table 2 represents a value of each syntax when a value of a residual coefficient $C_{15}$ is (−21).

TABLE 2

| Pass | Syntax Name | Formula |
| --- | --- | --- |
| pass 1 | sig_coeff_flag | 1 |
|  | abs_level_gtx_flag[0] | 1 |
|  | par_level_flag | 1 |
|  | abs_level_gtx_flag[1] | 1 |
| pass 2-1 | abs_remainder | 8 |
| pass 2-2 | dec_abs_level | — |
| pass 3 | coeff_sign_flag | 1 |

Table 3 represents a process in which a residual coefficient is reconstructed in a decoder.

TABLE 3

| | Formula |
| --- | --- |
| $TmpC_N$ | sig_coeff_flag + abs_level_gtx_flag[0] + par_level_flag + (abs_level_gtx_flag[1]<<1) |
| $|C_N|$ | $TmpC_N$ + (abs_remainder<<1) |

In Table 3, a variable $TmpC_N$ represents a temporary reconstructed coefficient in a state where a value of abs_remainder is not reflected. When a syntax, abs_remainder, does not exist (e.g., when abs_level_gtx_flag[0] or abs_level_gtx_flag[1] is 0), a temporary reconstructed coefficient $TmpC_N$ may be set as an absolute value of a residual coefficient. On the other hand, when a syntax, abs_remainder, exists (e.g., when abs_level_gtx_flag[1] is 1), an absolute value of a residual coefficient may be derived by adding a value derived by abs_remainder (specifically, a value derived by shifting abs_remainder by 1 to the left) to a temporary reconstructed coefficient $TmpC_N$.

In an example, in reference to an example of Table 2, a value of variable $TmpC_{15}$ for a residual coefficient $C_{15}$ may be derived as 5 (specifically, 1+1+1+(1<<1)). In addition, an absolute value $|C_{15}|$ for a residual coefficient $C_{15}$ may be derived as 21 by adding a value derived by shifting abs_remainder by 1 to the left (i.e., 16) to a temporary residual coefficient $TmpC_{15}$ (i.e., 5).

Subsequently, through a value of coeff_sign_flag, a value of a residual coefficient $C_0$ may be finally reconstructed to −21.

Pass represents encoding order and decoding order. In an example, in a decoder, syntaxes belonging to 2 pass may be decoded after decoding all syntaxes belonging to 1 pass. In addition, syntaxes belonging to 3 pass may be decoded after decoding all syntaxes belonging to 2 pass.

In a shown example, 2-2 pass represents an alternate path of 1 pass, 2-1 pass and 3 pass.

When a coefficient of a bin encoded by using context information is smaller than a threshold value, an absolute value of a residual coefficient may be encoded through 1 pass and 2-1 pass. On the other hand, when a coefficient of a bin encoded by using context information is equal to or greater than a threshold value, an absolute value of a residual coefficient may be encoded through 2-2 pass.

Figure 8:
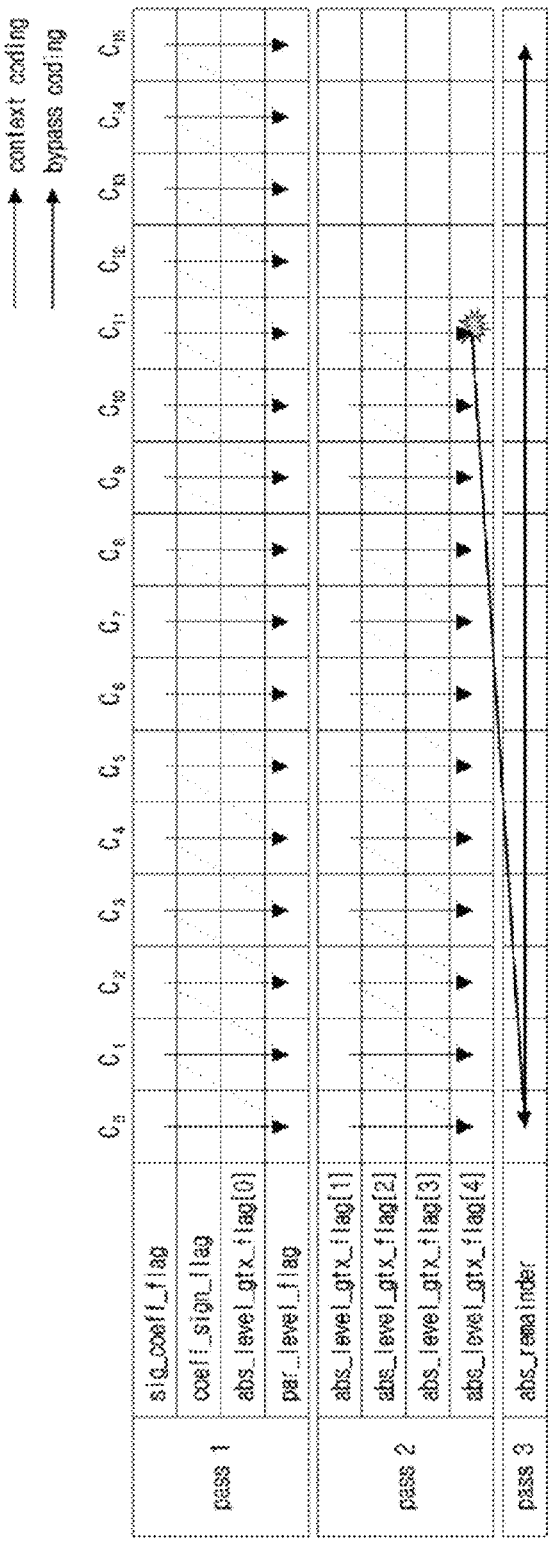
FIG. 8 represents an example in which a residual coefficient is encoded/decoded under a TSRC method.

FIG. 8 represents an example in which a residual coefficient is encoded/decoded under a TSRC method.

For convenience of a description, it is assumed that a residual coefficient is encoded/decoded in a unit of a 4×4-sized sub-block. In addition, it is assumed that the maximum number of bins encoded/decoded by using context information (i.e., a threshold value) is 112.

When a TSRC method is applied, a residual coefficient may be encoded/decoded according to a diagonal scan direction from a top-left residual coefficient to bottom-right residual coefficient in a sub-block. In FIG. 8, $C_{15}$ represents a residual coefficient at a bottom-right position in a sub-block and $C_0$ represents a residual coefficient at a top-left position in a sub-block.

In addition, in FIG. 8, an arrow with a thin solid line represents bins encoded/decoded by using context information and an arrow with a thick solid line represents bins encoded/decoded without using context information. In addition, a connection line between arrows represents encoding/decoding order of each syntax.

Under a TSRC method, up to 5 abs_level_gtx_flag[N] may be used.

Table 4 uses a formula to define syntaxes used to encode/decode a residual coefficient under a TSRC method.

TABLE 4

| pass | Syntax Name | Formula |
| --- | --- | --- |
| pass 1 | sig_coeff_flag | $C_N != 0$ |
|  | coeff_sign_flag | $C_N < 0\ ?\ 1 : 0$ |
|  | abs_level_gtx_flag[0] | $!!\ (\ |C_N| - 1\ )$ |
|  | par_level_flag | $(\ |C_N| - 2\ )\ \&\ 1$ |
| pass 2 | abs_level_gtx_flag[1] | $(\ |C_N| - 2\ ) >= 4$ |
|  | abs_level_gtx_flag[2] | $(\ |C_N| - 2\ ) >= 6$ |
|  | abs_level_gtx_flag[3] | $(\ |C_N| - 2\ ) >= 8$ |
|  | abs_level_gtx_flag[4] | $(\ |C_N| - 2\ ) >= 10$ |
| pass 3 | abs_remainder | $(\ |C_N| - 10\ ) >> 1$ |

Table 5 represents a value of each syntax when a value of a residual coefficient $C_0$ is (−21).

TABLE 5

| pass | Syntax Name | Formula |
| --- | --- | --- |
| pass 1 | sig_coeff_flag | 1 |
|  | coeff_sign_flag | 1 |
|  | abs_level_gtx_flag[0] | 1 |
|  | par_level_flag | 1 |
| pass 2 | abs_level_gtx_flag[1] | 1 |
|  | abs_level_gtx_flag[2] | 1 |
|  | abs_level_gtx_flag[3] | 1 |
|  | abs_level_gtx_flag[4] | 1 |
| pass 3 | abs_remainder | 5 |

Table 6 represents a process in which a residual coefficient is reconstructed in a decoder.

TABLE 6

| | Formula |
| --- | --- |
| $TmpC_N$ | sig_coeff_flag + abs_level_gtx_flag[0] + par_level_flag |
| $C_N$ | $TmpC_N$ + (abs_level_gtx_flag[1]<<1) + (abs_level_gtx_flag[2]<<1) + (abs_level_gtx_flag[3]<<1) + (abs_level_gtx_flag[4]<<1) + (abs_remainder<<1) |

In Table 6, a variable $TmpC_N$ represents a temporary reconstructed coefficient derived in a pass1 process. When encoding/decoding for pass2 should be additionally performed (e.g., when abs_level_gtx_flag[0] is 1), an absolute value of a residual coefficient may be updated by using at least one of abs_level_gtx_flag[1], abs_level_gtx_flag[2], abs_level_gtx_flag[3], abs_level_gtx_flag[4] or, abs_remainder.

In an example, in reference to an example of Table 5, a value of a variable $TmpC_0$ for a residual coefficient $C_0$ may be derived as 3 (specifically, 1+1+1). In addition, an absolute value $|C_0|$ for a residual coefficient $C_0$ may be derived as 21 by adding a value (i.e., 10) derived by shifting abs_remainder by 1 to the left and a sum (i.e., 8) of values derived by shifting each of abs_level_gtx_flag[1], abs_level_gtx_flag[2], abs_level_gtx_flag[3] and abs_level_gtx_flag[4] by 1 to the left to a temporary residual coefficient $TmpC_0$ (i.e., 3).

Subsequently, through a value of coeff_sign_flag, a value of a residual coefficient $C_0$ may be finally reconstructed to −21.

When the number of bins encoded by using context information is counted, a counter may be set not to operate when encoding information representing a position of a last non-zero residual coefficient. In other words, the information may be excluded from counting.

Alternatively, when encoding a flag representing whether there is a non-zero residual coefficient per sub-block in a current block, a counter may be set not to operate. In other words, the flag may be excluded from counting.

According to an embodiment of the present disclosure, in order to limit the number of bins encoded by using context information, when the number of bins encoded by using context information is equal to or greater than a threshold value, an absolute value of a residual coefficient may be encoded as it is instead of encoding a residual coefficient sequentially by using abs_level_gtx_flag[N]. In an example, when the number of bins encoded by using context information is smaller than a threshold value, an absolute value of a residual coefficient may be encoded by using at least one of sig_coeff_flag, coeff_sign_flag, abs_level_gtx_flag[N] or abs_remainder. On the other hand, when the number of bins encoded by using context information is equal to or greater than a threshold value, dec_abs_level, a syntax representing an absolute value of a residual coefficient, may be encoded.

A decoder may also operate a counter whenever a bin encoded by using context information is decoded. When a value of a counter is smaller than a threshold value, an absolute value of a residual coefficient may be reconstructed by using at least one of sig_coeff_flag, coeff_sign_flag, abs_level_gtx_flag[N] or abs_remainder. On the other hand, when a value of a counter is equal to or greater than a threshold value, an absolute value of a residual coefficient may be reconstructed by using a syntax, dec_abs_level.

When the number of bins encoded/decoded by using context information is equal to or greater than a threshold value, performing encoding/decoding by using a syntax, dec_abs_level, may be applied only to a RC method or a TSRC method.

Alternatively, for both a RC method and a TSRC method, when the number of bins encoded/decoded by using context information is equal to or greater than a threshold value, encoding/decoding may be performed by using a syntax, dec_abs_level. In this case, a threshold value under a RC method and a TSRC method may be set differently.

Before entropy encoding is performed for a specific syntax, binarization of a corresponding syntax is preceded. In an example, a bin string for a syntax may be generated by at least one of a Fixed Length Binarization method, a Truncated Unary Binarization method, a Truncated Rice Binarization method or a k-th Exponential Golomb Binarization method.

Among them, a truncated rice binarization method may be performed by using two parameters. Specifically, in a truncated rice binarization method, a cMax parameter and a rice parameter (cRiceParam) may be used. Here, a cMax parameter represents the maximum length of a bin string to be binarized and it may be referred to as the maximum length parameter.

In a truncated rice binarization method, a value to be encoded (i.e., a symbol value) may be divided into a prefix and a suffix. Specifically, a prefix may be derived based on the following Equation 1.

$$PrefixVal = symbolVal >> cRiceParam \quad \text{[Equation 1]}$$

In Equation 1, prefixVal represents a prefix value and symbolVal represents a value to be encoded. Subsequently, a prefix value may be binarized. In an example, Table 7 represents a binarization result according to a prefix value (i.e., a bin string).

TABLE 7

| prefixVal | Bin string | | | | | |
| --- | --- | --- | --- | --- | --- | --- |
| 0 | 0 | | | | | |
| 1 | 1 | 0 | | | | |
| 2 | 1 | 1 | 0 | | | |
| 3 | 1 | 1 | 1 | 0 | | |
| 4 | 1 | 1 | 1 | 1 | 0 | |
| 5 | 1 | 1 | 1 | 1 | 1 | 0 |
| ... | | | | | | |
| bin index | 0 | 1 | 2 | 3 | 4 | 5 | ... |

When a prefix value is smaller than a result obtained by shifting a cMax parameter by rice parameter cRiceParam to the right (i.e., cMax>>cRiceParam), after generating a bin array of 1 with the same length as a prefix value, a bin string that 0 is added to a last of the bin array may be generated. On the other hand, when a prefix value is the same as a result obtained by shifting a cMax parameter by rice parameter cRiceParam to the right, a bin array of 1 with the same length as a prefix value may be generated.

Table 8 illustrates a bin string for each prefix when a result obtained by shifting a cMax parameter by rice parameter cRiceParam to the right is 6.

TABLE 8

| prefixVal | Bin string | | | | | |
|---|---|---|---|---|---|---|
| 0 | 0 | | | | | |
| 1 | 1 | 0 | | | | |
| 2 | 1 | 1 | 0 | | | |
| 3 | 1 | 1 | 1 | 0 | | |
| 4 | 1 | 1 | 1 | 1 | 0 | |
| 5 | 1 | 1 | 1 | 1 | 1 | 0 |
| 6 | 1 | 1 | 1 | 1 | 1 | 1 |
| bin index | 0 | 1 | 2 | 3 | 4 | 5 |

When a cMax parameter is greater than a value to be encoded and rice parameter cRiceParam is greater than 0, a suffix may be additionally encoded/decoded. Otherwise, a suffix is not used. When a suffix is used, according to the following Equation 2, a suffix value may be derived.

$$\text{suffixVal} = \text{symbolVal} - (\text{prefixVal} << c\text{RiceParam}) \quad \text{[Equation 2]}$$

In Equation 2, suffixVal represents a suffix value.

A suffix value may be binarized by a fixed length binarization method. When a fixed length binarization method is applied, a value of a cMax parameter for binarizing a suffix value may be derived by the following Equation 3.

$$c\text{Max} = (1 << c\text{RiceParam}) - 1 \quad \text{[Equation 3]}$$

A length of a bin string generated by encoding a suffix value has a fixed length. In this case, a length of a bin string may be derived by the following Equation 4.

$$\text{fixedLength} = \text{Ceil}(\text{Log}_2(c\text{Max}+1)) \quad \text{[Equation 4]}$$

In the Equation 4, fixedLength represents a fixed length (i.e., a length of a bin string). A Ceil( ) function represents a lifting function. When a fixed length binarization method is applied, the maximum number of values which may be binarized may be set as $2^{\text{fixedLength}}$. In an example, when a value of a variable, fixedLength, is 2, up to 4 values may be binarized.

The following Table 9 represents an example that 4 values are binarized when a variable, fixedLength, is 2.

TABLE 9

| Val | Bin string | |
|---|---|---|
| 0 | 0 | 0 |
| 1 | 0 | 1 |
| 2 | 1 | 0 |
| 3 | 1 | 1 |
| bin index | 0 | 1 |

Under a limited k-th exponential golomb binarization method, a variable k, a variable maxPreExtLen and a variable truncSuffixLen are used to binarize a symbol value. Specifically, Table 10 represents an example that a symbol value is binarized under a limited k-th exponential golomb binarization method.

TABLE 10

```
codeValue = symbolVal  >>  k
preExtLen = 0
while( ( preExtLen < maxPreExtLen )  &&  ( codeValue > ( ( 2  <<
```

TABLE 10-continued

```
preExtLen ) - 2 ) ) )
{
  preExtLen++
  put( 1 )
}
if( preExtLen  = =  maxPreExtLen )
  escapeLength = truncSuffixLen
else {
  escapeLength = preExtLen + k
  put( 0 )
}
symbolVal = symbolVal - ( ( ( 1  <<  preExtLen ) - 1 )  <<  k )
while( ( escapeLength- - ) > 0 )
  put( ( symbolVal  >>   escapeLength ) & 1 )
```

Regarding a residual coefficient, binarization of syntaxes may be performed by mixing a truncated rice binarization method and a limited k-th exponential golomb binarization method. In an example, for a syntax, abs_remainder, and a syntax, dec_abs_level, binarization may be performed by mixing a truncated rice binarization method and a limited k-th exponential golomb binarization method.

Hereinafter, a method of binarizing a syntax, abs_remainder, will be illustrated, but, an example described after may be also applied equally to a case in which a syntax, dec_abs_level, is binarized.

In an example, after dividing a syntax, abs_remainder, into a prefix part and a suffix part, a prefix part may be binarized by a truncated rice binarization method and a suffix part may be binarized by a limited k-th exponential golomb binarization method. Specifically, while a prefix of a syntax, abs_remainder, is applied as a symbol value (symbolVal) of a truncated rice binarization method, a suffix of a syntax, abs_remainder, may be input as a symbol value (SymbolVal) of a limited k-th exponential golomb binarization method.

Under a truncated rice binarization method, a symbol value is divided into a prefix part and a suffix part. In other words, a prefix part of a syntax, abs_remainder, may be reclassified into a prefix part and a suffix part. For convenience of a description, a 'first' prefix is attached to a result from primarily classifying a syntax, abs_remainder, into a prefix part and a suffix part and a 'second' prefix is attached to a result from reclassifying a first prefix part into a prefix part and a suffix part. When a 'first' or 'second' affix is not added, corresponding contents should be commonly applied to a first and second prefix or a first and second suffix or should be interpreted as one of a first and second prefix or a first and second suffix depending on context.

Only when a prefix value is the same as a value obtained by shifting a cMax parameter by rice parameter cRiceParam to the right, binarization of a suffix part may be performed. In an example, when a value obtained by shifting a cMax parameter by rice parameter cRiceParam to the right is 6, binarization of a suffix part may be performed only when a result generated by binarizing a prefix by a truncated rice binarization method is '111111' (i.e., when a prefix value is 6).

In order to binarize a prefix part of a syntax, abs_remainder, (i.e., a first prefix) by a truncated rice binarization method, a value of a cMax parameter and a rice parameter cRiceParam should be set. In this case, a value of a rice parameter may be adaptively determined according to an encoding method of a residual coefficient.

In an example, when a residual coefficient is encoded by a TSRC method, a rice parameter cRiceParam may be set as a predefined constant. Here, a predefined constant may be 1. Alternatively, a predefined constant may be a natural number such as 2, 3 or 4.

On the other hand, when a residual coefficient is encoded by a RC method, a rice parameter cRiceParam may be derived by referring to information of surrounding reference pixels. Specifically, in reference to at least one residual coefficient reconstructed before a current residual coefficient, a rice parameter cRiceParam for a current residual coefficient may be derived.

example, when C is equal to or smaller than A, A is output as a result of a Clip3 function. When C is equal to or greater than B, B is output as a result of a Clip3 function. When the two conditions are not satisfied, C is output as a result of a Clip3 function.

When a variable locSumAbs is derived, a rice parameter cRiceParam may be derived by referring to a predefined lookup table. Table 11 illustrates a mapping relation between a value of a variable locSumAbs and a rice parameter cRiceParam.

TABLE 11

| locSumAbs | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| cRiceParam | 0 | 0 | 0 | 0 | 0 | 0 | 0 | 1 | 1 | 1 | 1 | 1 | 1 | 1 | 2 | 2 |
| locSumAbs | 16 | 17 | 18 | 19 | 20 | 21 | 22 | 23 | 24 | 25 | 26 | 27 | 28 | 29 | 30 | 31 |
| cRiceParam | 2 | 2 | 2 | 2 | 2 | 2 | 2 | 2 | 2 | 2 | 2 | 2 | 3 | 3 | 3 | 3 |

Figure 9:
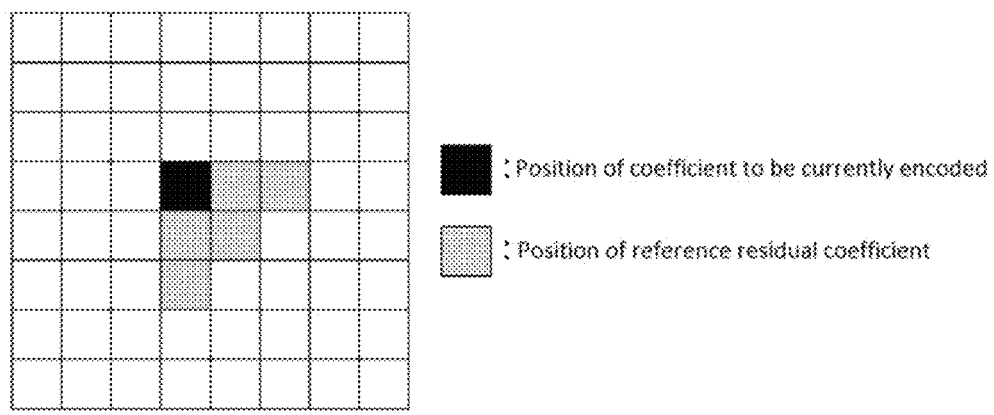
FIG. 9 is a diagram which illustrates a position of reference residual coefficients used to derive a rice parameter.

FIG. 9 is a diagram which illustrates a position of reference residual coefficients used to derive a rice parameter.

When a residual coefficient is encoded by a RC method, pixels at a right and/or bottom position of a current pixel and having a distance of 2 or less from a current pixel may be set as a reference pixel. Here, a distance from a current pixel represents pixels that a sum of a x-axis coordinate difference and a y-axis coordinate difference with a current pixel is 2 or less. In an example, when a position of a current pixel is (x, y), pixels at a position of (x, y+1), (x, y+2), (x+1, y), (x+2, y) and (x+1, y+1) may be set as reference pixels.

Unlike a shown example, pixels distant by 1 or less from a current pixel or pixels distant by N or less from a current pixel may be used as reference pixels. Here, N may be a natural number such as 3 or 4, etc.

Subsequently, a variable locSumAbs may be derived by combining an absolute value of each reference pixel. In other words, a variable locSumAbs may represent a sum of absolute values of residual coefficients at a position of (x, y+1), (x, y+2), (x+1, y), (x+2, y) and (x+1, y+1). In an example, an absolute value of each residual coefficient, as in an example of Table 3, may be derived based on a syntax sig_coeff_flag, abs_level_gtx_flag[0], par_level_falg, abs_level_gtx_flag[1] and abs_remainder.

When a variable locSumAbs is derived, in order to force a value of the variable locSumAbs to be within a predefined range, a clipping function may be applied. In an example, Equation 5 represents an example that a value of a variable locSumAbs is updated by applying a clipping function.

$$\text{locSumAbs} = \text{Clip3}(0, 31, \text{locSumAbs} - \text{baseLevel} * 5) \quad \text{[Equation 5]}$$

In the Equation 5, baseLevel may be set as a fixed value. In an example, baseLevel may be fixed as 4. Alternatively, based on at least one of a size of a current block, a position of a current pixel, or whether a current pixel is adjacent to a block boundary, a value of a variable baseLevel may be adaptively determined.

Alternatively, according to a type of a syntax to be binarized, a value of baseLevel may be set differently. In an example, while a value of baseLevel is set as 4 when a syntax, abs_remainder, is binarized, a value of baseLevel is set as 0 when a syntax, dec_abs_level, is binarized.

A Clip3 (A, B, C) function is a function which determines an output value by comparing C with A and B. In an As illustrated in Table 9, according to a value of a variable locSumAbs, a value of a rice parameter cRiceParam may be determined as one of 0 to 3.

Contrary to the above-described example, when a residual coefficient is encoded by a TSRC method, a rice parameter cRiceParam may be derived by referring to information of residual coefficients and when a residual coefficient is encoded by a RC method, a rice parameter cRiceParam may be set as a fixed value. When a residual coefficient is encoded by a TSRC method, surrounding residual coefficients may include pixels having a distance of N or less with a current pixel while being at a top and/or left position of a current pixel. Here, N may be a natural number such as 1, 2 or 3.

Alternatively, for each of a TSRC method and a RC method, a rice parameter cRiceParam may be set as a predefined value.

Alternatively, for each of a TSRC method and a RC method, a rice parameter cRiceParam may be derived by referring to information of reference residual coefficients.

When a rice parameter cRiceParam is derived, based on a rice parameter cRiceParam, a cMax parameter may be derived. In an example, Equation 6 shows an example in which a cMax parameter is derived.

$$c\text{Max} = 6 << c\text{RiceParam} \quad \text{[Equation 6]}$$

When a cMax parameter and a rice parameter cRiceParam are derived, a first prefix of a syntax abs_remainder may be derived as in the following Equation 7.

$$\text{prefixVal} = \text{Min}(c\text{Max}, \text{abs\_remainder}) \quad \text{[Equation 7]}$$

When a first prefix prefixVal is derived, a first prefix prefixVal may be binarized by a truncated rice binarization method by using a cMax parameter and a rice parameter cRiceParam. Specifically, a first prefix prefixVal may be input as a symbol value SymbolVal for truncated rice binarization.

Specifically, in order to binarize a first prefix prefixVal by a truncated rice binarization method, a first prefix may be classified into a second prefix and a second suffix.

In an example, it is assumed that a value of a syntax abs_remainder is 23 and a rice parameter cRiceParam is 2. By Equation 6, a cMax parameter may be derived as 24 (6<<2). And, by Equation 7, a first prefix prefixVal of a syntax abs_remainder may be set as 23.

Based on a cMax parameter and a rice parameter cRiceParam, a first prefix prefixVal may be classified into a second prefix and a second suffix. In an example, a prefix part of a first prefix prefixVal (i.e., a second prefix) may be derived by Equation 1 and a suffix part of a first prefix prefixVal (i.e., a second suffix) may be derived by Equation 2.

In an example, when a first prefix prefixVal is set as a symbol value SymbolVal, a second prefix prefixVal may be set as 5 by Equation 1. A value of a second prefix prefixVal is smaller than 6, a result value obtained from shifting a cMax parameter by rice parameter cRiceParam to the right, so it may be binarized as '111110' as in Table 8.

A cMax parameter is greater than a value to be encoded (i.e., a first prefix, 23) and a rice parameter cRiceParam has a value greater than 0, so a suffix for a first prefix (i.e., a second suffix) may be additionally binarized. Specifically, by Equation 2, a value of a second suffix SuffixVal may be derived as 3 (23−(5<<2)). And, a value of a cMax parameter for binarizing a second suffix by a fixed length binarization method may be derived as 3 ((1<<2)−1) by Equation 3. In addition, a length of a bin string generated by binarizing a second suffix may be derived as 2 by Equation 4. As a result, a second suffix may be binarized as '11'.

As above, as a result of binarizing 23, a first prefix value of a syntax abs_remainder, a bin string of '11111011' is generated. The bin string is different from a result value (i.e., 111111) obtained by shifting a cMax parameter by rice parameter cRiceParam to the right, so a process of generating a suffix for a syntax abs_remainder (i.e., a first suffix) may be omitted.

Next, a binarization process when a value of a syntax abs_remainder is 25 and a value of a rice parameter cRiceParams is 2 is described. By Equation 6, a cMax parameter may be derived as 24 (6<<2). And, by Equation 7, a first prefix prefixVal of a syntax abs_remainder may be set as 24.

Based on a cMax parameter and a rice parameter cRiceParam, a first prefix prefixVal may be classified into a second prefix and a second suffix. In an example, when a first prefix prefixVal is set as a symbol value SymbolVal, a second prefix prefixVal may be set as 6 by Equation 1. A value of a second prefix prefixVal is smaller than 6, a result value obtained by shifting a cMax parameter by rice parameter cRiceParam to the right, so it may be binarized as '111111' as in Table 8.

A cMax parameter is not greater than a value to be encoded (i.e., a first prefix, 24), so binarization for a suffix for a first prefix (i.e., a second suffix) may be omitted. As a result, as a result of binarizing 24, a first prefix value of a syntax abs_remainder, a bin string of '111111' is generated. The bin string is the same as a result value (i.e., 111111) obtained by shifting a cMax parameter by rice parameter cRiceParam to the right, so a process of binarizing a suffix for a syntax abs_remainder (i.e., a first suffix) may be additionally performed.

A first suffix for a syntax abs_remainder may be derived as in the following Equation 8.

SuffixVal=abs_remainder−cMax     [Equation 8]

By the Equation 8, a first suffix SuffixVal for a syntax abs_remainder may be derived as 1 (25−24).

A first suffix SuffixVal may be binarized by a limited k-th exponential golomb binarization method. Under a limited k-th exponential golomb binarization method, a variable k may be set as a value obtained by adding 1 to a rice parameter cRiceParam (i.e., cRiceParam+1). In addition, a variable maxPreExtLen and a variable truncSuffixLen may be determined based on a value of a first suffix SuffixVal. In an example, when a first suffix SuffixVal is input as a symbol value SymbolVal, a value of a variable maxPreExtLen and a variable truncSuffixLen may be derived according to a procedure disclosed in Table 10. In an example, when a first suffix SuffixVal is 1, according to an example of Table 10, a variable maxPreExtLen and a variable trunSuffixLen may be set as 11 and 15, respectively.

As in the above-described example, a syntax abs_remainder and a syntax dec_abs_level related to a residual coefficient may be binarized by using a limited k-th exponential golomb binarization method and a truncated rice binarization method based on a rice parameter cRiceParam. In this case, for efficient binarization of the syntaxes, it can be said that it is very important to set a rice parameter cRiceParam as a proper value.

As in the above-described example, a rice parameter may be derived based on locSumAbs, a sum of absolute values of reference residual coefficients. But, when a bit depth of an image is large or a value of a quantization parameter is small, a value of a variable locSumAbs representing a sum of absolute values of reference residual coefficients also tends to have a large value. Also in this case, when a rice parameter cRiceParam is set based on the above-described Equation 5 and Table 9, a value of a Rice parameter cRiceParam will tend to be set as a large value (e.g., 2 or 3).

In other words, when a bit depth of an image is large or a value of a quantization parameter is small, a problem occurs that it is difficult to set a rice parameter cRiceParam as a proper value by using only a value of a variable locSumAbs.

In order to solve the problem, according to an interval to which a variable locSumAbs belongs, a method of deriving a rice parameter cRiceParam is proposed. A value of a rice parameter cRiceParam may be also set as a value (e.g., a value equal to or greater than 4) different from a value defined in Table 9 (e.g., 0 to 3) by applying the after-described embodiment.

Figure 10:
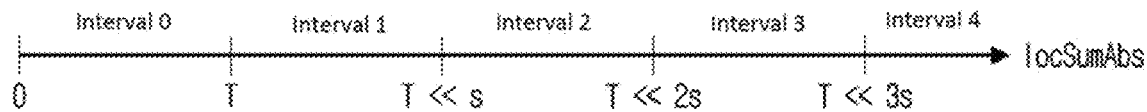
FIG. 10 is to explain an example in which a rice parameter, cRiceParam, is determined according to an interval to which a variable, locSumAbs, belongs.

FIG. 10 is to explain an example in which a rice parameter, cRiceParam, is determined according to an interval to which a variable, locSumAbs, belongs.

When a threshold value T is determined, each interval may be defined by using a threshold value T. Specifically, interval 0 may be defined from 0 to T−1 and interval N excluding a last interval and interval 0 may be defined from (T<<(N−1)s) to ((T<<Ns)−1). A last interval M may be defined as an interval equal to or greater than (T<<(M−1)s).

In FIG. 10, it was illustrated that 5 intervals are defined, but more or less intervals than illustrated may be defined.

In this case, the number of intervals may be predefined in an encoder and a decoder. For example, 3, 4, 5 or 6 intervals may be predefined. Alternatively, the number of intervals may be adaptively determined based on at least one of a bit depth, a quantization parameter or a threshold value.

Alternatively, according to a type of a syntax, the number of intervals may be set differently. In an example, the number of intervals for a syntax abs_remainder and the number of intervals for a syntax dec_abs_level may be different.

A threshold value T may be predefined in an encoder and a decoder. Alternatively, information for determining a threshold value T may be signaled in a bitstream. The information may be signaled through a sequence parameter set (SPS), a picture parameter set (PPS) or a slice header. The information may be index information indicating one of a plurality of threshold value candidates. Alternatively, the information may indicate a threshold value or indicate a value derived by subtracting a predetermined value (e.g., 1) from a threshold value.

Alternatively, a threshold value T may be adaptively determined based on at least one of a bit depth, a quantization parameter, a size/a shape of a current block or an encoding method of a residual coefficient (e.g., whether a TSRC method or a RC method is applied).

Alternatively, according to a type of a syntax, a threshold value may be set differently. In an example, a threshold value T for a syntax abs_remainder and a threshold value T for a syntax dec_abs_level may be different.

A variable s may be predefined in an encoder and a decoder. Alternatively, information for determining a variable s may be signaled in a bitstream. The information may be signaled through a sequence parameter set (SPS), a picture parameter set (PPS) or a slice header. The information may be index information indicating one of a plurality of variable s candidates. Alternatively, the information may indicate a variable s or indicate a value derived by subtracting a predetermined value (e.g., 1) from a variable s.

Alternatively, a variable s may be adaptively determined based on at least one of a bit depth, a quantization parameter, a size/a shape of a current block or an encoding method of a residual coefficient (e.g., whether a TSRC method or a RC method is applied).

Alternatively, according to a type of a syntax, a variable s may be set differently. In an example, a variable s for a syntax abs_remainder and a variable s for a syntax dec_abs_level may be different.

A shifting parameter may be mapped per each interval. In an example, a shifting parameter shift corresponding to interval 0 may have a value of 0 and a shifting parameter shift corresponding to interval N excluding interval 0 may be set as (s<<(N−1)). In an example, a shifting parameter shift corresponding to interval 1 may have a value of s, a shifting parameter shift corresponding to interval 2 may have a value of 2s and a shifting parameter shift corresponding to interval 3 may have a value of 4s.

After deriving a variable locSumAbs by adding a sum of absolute values of residual coefficients of each reference pixel, an interval to which a variable locSumAbs belongs may be determined. When an interval to which a variable locSumAbs belongs is determined, a shifting parameter corresponding to an interval to which a variable locSumAbs belongs may be obtained. When a shifting parameter corresponding to an interval to which a variable locSumAbs belongs is obtained, a variable locSumAbs may be scaled based on an obtained shifting parameter. In an example, as in the following Equation 9, a variable locSumAbs may be updated by scaling a variable locSumAbs.

$$locSumAbs=locSumAbs>>shift \quad\quad \text{[Equation 9]}$$

Subsequently, a variable locSumAbs and a lookup table may be used to derive an initial rice parameter, cRiceParam. In an example, after updating a variable, locSumAbs, by applying a clipping function in Equation 5 to a variable, locSumAbs, an updated variable, locSumAbs, and a lookup table in Table 9 may be used to derive an initial rice parameter, cRiceParam.

Subsequently, a value of a final rice parameter, cRiceParam, may be obtained by combining an initial rice parameter, cRiceParam, and a shifting parameter, shift. In an example, as in an example of the following Equation 10, an extended rice parameter, cRiceParam, may be obtained by adding a shifting parameter, shift, to an initial rice parameter, cRiceParam.

$$cRiceParam=cRiceParam+shift \quad\quad \text{[Equation 10]}$$

When an extended rice parameter, cRiceParam, is derived, binarization for a syntax, abs_remainder, or a syntax, dec_abs_level, may be performed based on the extended rice parameter.

In the above-described example, it was illustrated that a shifting parameter, shift, is obtained through a process of determining an interval to which a variable, locSumAbs, belongs.

In another example, a shifting parameter, shift, may be derived based on a value of a normalized variable, locSumAbs, after performing normalization for a variable, locSumAbs, while omitting a process of determining an interval to which a variable, locSumAbs, belongs. Specifically, as in an example of the following Equation 11, a variable, scaledVal, may be obtained by scaling a value of a variable, locSumAbs.

$$scaledVal=(locSumAbs*A)>>B \quad\quad \text{[Equation 11]}$$

In the Equation 11, variable A and variable B represent a scaling parameter used to scale a variable, locSumAbs. At least one of variable A and variable B may be set differently according to a type of a syntax to be encoded/decoded. In an example, for a case in which a syntax, abs_remainder, is binarized and a case in which a syntax, dec_abs_level, is binarized, at least one of variable A and variable B may be set differently.

Alternatively, at least one of variable A and variable B may be independently determined per color component or may be set differently per color component.

Alternatively, at least one of variable A and variable B may be set as a value which is predefined in an encoder and a decoder.

Alternatively, information for determining at least one of variable A and variable B may be signaled. The information may be signaled through a SPS, a PPS or a slice header. In an example, first information for determining variable A or second information for determining variable B may be signaled respectively or index information specifying at least one of a plurality of set candidates configured with a set of variable A and variable B may be signaled.

Alternatively, at least one of variable A and variable B may be adaptively determined based on at least one of a bit depth, a quantization parameter, a size/a shape of a current block or an encoding method of a residual coefficient (e.g., whether a TSRC method or a RC method is applied).

When a variable, scaledVal, is derived, a shifting parameter, shift, may be derived by using the variable. In an example, as in the following Equation 12, a shifting parameter, shift, may be derived.

$$shift=(scaledVal==0)?0:Floor(Log\ 2(scaledVal)) \quad\quad \text{[Equation 12]}$$

In Equation 12, a Floor(x) function outputs a result of rounding down x. By the Equation 12, when a variable, scaledVal, is 0, a shifting parameter, shift, may be set as 0 and when a variable, scaledVal, is not 0, a shifting parameter, shift, may be set as $Floor(Log_2(scaledVal))$.

When a shifting parameter, shift, is derived, as in an example of Equation 9, a variable, locSumAbs, may be updated. Subsequently, a variable locSumAbs and a lookup table may be used to derive an initial rice parameter, cRiceParam. In an example, after updating a variable, locSumAbs, by applying a clipping function in Equation 5 to a variable, locSumAbs, an updated variable, locSumAbs, and a lookup table in Table 9 may be used to derive an initial rice parameter, cRiceParam.

Subsequently, as in an example of Equation 10, a value of a final rice parameter, cRiceParam, may be obtained by combining an initial rice parameter, cRiceParam, and a shifting parameter, shift.

Variables for de-binarization may be also obtained in the same way as in an encoder in a decoder. For example, the above-described method of deriving a rice parameter, cRiceParam, may be commonly applied in an encoder and a decoder. When a rice parameter, cRiceParam, is obtained, a value of a syntax, abs_remainder, and/or a syntax, dec_abs_level, may be reconstructed through de-binarization of a bin string.

Syntaxes used in the above-described embodiments are just named for convenience of a description.

When embodiments described based on a decoding process or an encoding process are applied to an encoding process or a decoding process, it is included in a scope of the present disclosure. When embodiments described in a predetermined order are changed in an order different from a description, it is also included in a scope of the present disclosure.

The above-described embodiment is described based on a series of stages or flow charts, but it does not limit a time series order of the present disclosure and if necessary, it may be performed at the same time or in a different order. In addition, each component (e.g., a unit, a module, etc.) configuring a block diagram in the above-described embodiment may be implemented as a hardware device or a software and a plurality of components may be combined and implemented as one hardware device or software. The above-described embodiment may be recorded in a computer readable recoding medium by being implemented in a form of a program instruction which may be performed by a variety of computer components. The computer readable recoding medium may include a program instruction, a data file, a data structure, etc. solely or in combination. A hardware device which is specially configured to store and perform magnetic media such as a hard disk, a floppy disk and a magnetic tape, optical recording media such as CD-ROM, DVD, magneto-optical media such as a floptical disk and a program instruction such as ROM, RAM, a flash memory, etc. is included in a computer readable recoding medium. The hardware device may be configured to operate as one or more software modules in order to perform processing according to the present disclosure and vice versa.

INDUSTRIAL APPLICABILITY

The present disclosure may be applied to an electronic device which may encode/decode an image.

The invention claimed is:

1. A method of decoding an image, the method comprising:
   determining whether an inverse transform is skipped for a current block;
   decoding, based on a rice parameter, information on a residual coefficient of the current block;
   reconstructing the residual coefficient based on the information; and
   obtaining a residual sample of the current block from the residual coefficient,
   wherein the rice parameter for the residual coefficient is obtained by:
   deriving an initial sum of absolute value variable based on a sum of absolute values of reference residual coefficients;
   obtaining a shifting parameter based on the initial sum of absolute value variable;
   obtaining a sum of absolute value variable by updating the initial sum of absolute value variable based on the shifting parameter;
   obtaining, based on the sum of absolute value variable, an initial rice parameter from a rice parameter mapping table; and
   obtaining the rice parameter by updating the initial rice parameter based on the shifting parameter,
   wherein the shifting parameter is one of a plurality of shifting parameter candidates, and
   wherein a selection of the one from the plurality of shifting parameter is based on an interval to which the initial sum of absolute value variable belongs among a plurality of intervals.

2. The method of claim 1, wherein a maximum value of the initial rice parameter is 3 while a maximum value of the rice parameter is greater than 3.

3. The method of claim 1, wherein the rice parameter is derived by adding the shifting parameter to the initial rice parameter.

4. The method of claim 1, wherein a number of the intervals is 5.

5. The method of claim 1, wherein a number of the reference residual coefficients is different between when the inverse transform is skipped for the current block and when the inverse transform is not skipped for the current block.

6. The method of claim 1, wherein each of the plurality of intervals is determined by a basis threshold value.

7. The method of claim 6, wherein an i-th interval defined as in a range of (i−1) times basis value to i times basis threshold value, i being 1 to 5, inclusive.

8. The method of claim 6, wherein the basis threshold value is predefined in a decoding apparatus.

9. The method of claim 1,
   wherein obtaining the sum of absolute value variable comprises:
   scaling the initial sum of absolute value variable based on the shifting parameter.

10. The method of claim 3, wherein obtaining the sum of absolute value variable further comprises subtracting a value derived based on a base level variable from a scaled initial sum of absolute value variable.

11. The method of claim 1, wherein the information is a first syntax representing a difference between 4 and an absolute value of the residual coefficient or a second syntax representing the absolute value of the residual coefficient.

12. A method of encoding an image, the method comprising:
   determining whether a transform is skipped for a current block;
   obtaining a residual coefficient of the current block by applying or skipping the transform;
   determining a syntax value for the residual coefficient; and
   encoding the syntax based on a rice parameter,
   wherein the rice parameter for the residual coefficient is obtained by:
   deriving an initial sum of absolute value variable based on a sum of absolute values of reference residual coefficients;
   obtaining a shifting parameter based on the initial sum of absolute value variable;
   obtaining a sum of absolute value variable by updating the initial sum of absolute value variable based on the shifting parameter;

obtaining, based on the sum of absolute value variable, an initial rice parameter from a rice parameter mapping table; and obtaining the rice parameter by updating the initial rice parameter based on the shifting parameter, wherein the shifting parameter is one of a plurality of shifting parameter candidates, and wherein a selection of the one from the plurality of shifting parameter is based on an interval to which the initial sum of absolute value variable belongs among a plurality of intervals.

13. A device for transmitting compressed video data, comprising:

a processor configured to obtain the compressed video data; and a transmitter configured to transmit the compressed video data, wherein obtaining the compressed video data comprises:

determining whether a transform is skipped for a current block;

obtaining a residual coefficient of the current block by applying or skipping the transform;

determining a syntax value for the residual coefficient; and encoding the syntax based on a rice parameter, wherein the rice parameter for the residual coefficient is obtained by:

deriving an initial sum of absolute value variable based on a sum of absolute values of reference residual coefficients;

obtaining a shifting parameter based on the initial sum of absolute value variable;

obtaining a sum of absolute value variable by updating the initial sum of absolute value variable based on the shifting parameter;

obtaining, based on the sum of absolute value variable, an initial rice parameter from a rice parameter mapping table; and obtaining the rice parameter by updating the initial rice parameter based on the shifting parameter, wherein the shifting parameter is one of a plurality of shifting parameter candidates, and wherein a selection of the one from the plurality of shifting parameter is based on an interval to which the initial sum of absolute value variable belongs among a plurality of intervals.

* * * * *